United States Patent
Bond et al.

(10) Patent No.: US 12,014,193 B2
(45) Date of Patent: Jun. 18, 2024

(54) SYSTEM AND METHOD FOR AUTOMATED PROCESS ORCHESTRATION

(71) Applicant: Ultima Business Solutions Limited, Berkshire (GB)

(72) Inventors: Simon Bond, Berkshire (GB); Amyn Jaffer, Berkshire (GB)

(73) Assignee: Ultima Business Solutions Limited, Reading (GB)

( * ) Notice: Subject to any disclaimer, the term of this patent is extended or adjusted under 35 U.S.C. 154(b) by 81 days.

(21) Appl. No.: 17/846,497

(22) Filed: Jun. 22, 2022

(65) Prior Publication Data

US 2022/0326974 A1    Oct. 13, 2022

Related U.S. Application Data

(63) Continuation of application No. PCT/GB2020/053367, filed on Dec. 23, 2020.

(60) Provisional application No. 62/952,957, filed on Dec. 23, 2019.

(51) Int. Cl.
| | |
|---|---|
| G06F 9/45 | (2006.01) |
| G06F 9/451 | (2018.01) |
| G06F 9/54 | (2006.01) |

(52) U.S. Cl.
CPC ............ G06F 9/452 (2018.02); G06F 9/54 (2013.01)

(58) Field of Classification Search
None
See application file for complete search history.

(56) References Cited

U.S. PATENT DOCUMENTS

| | | | |
|---|---|---|---|
| 6,950,991 B2 * | 9/2005 | Bloomfield | H04L 61/35 715/740 |
| 2012/0151373 A1 | 6/2012 | Kominac et al. | |
| 2012/0226742 A1 * | 9/2012 | Momchilov | G06F 3/048 709/203 |
| 2013/0297678 A1 | 11/2013 | Schach et al. | |

(Continued)

OTHER PUBLICATIONS

International Search Report and Written Opinion of the International Searching Authority dated Apr. 28, 2021 in International Patent Application No. PCT/GB2020/053367. 11 pages.

*Primary Examiner* — Craig C Dorais
(74) *Attorney, Agent, or Firm* — Kilpatrick Townsend & Stockton LLP

(57) ABSTRACT

A system and a method are described. The method comprises: establishing a remote desktop session between a first system and a second remotely located system having access to the remote application; the establishing including setting up a virtual channel for communication of data relating to graphical user interface interactions at the first system to the second system; preparing a command for execution by the remote application, the command including a command identifier and being configured to require a response; transmitting the command for the remote application from the first system to the second system via the virtual channel; receiving the command at the second system and providing the command to the remote application seeking to execute the command; generating a response to the provision of the command to the remote application, the response including the command identifier; and sending the response to the first system via the virtual channel.

28 Claims, 10 Drawing Sheets

(56) References Cited

U.S. PATENT DOCUMENTS

2019/0068390 A1\* 2/2019 Gross .................. H04L 12/1827
2019/0303779 A1 10/2019 Van Briggle et al.

\* cited by examiner

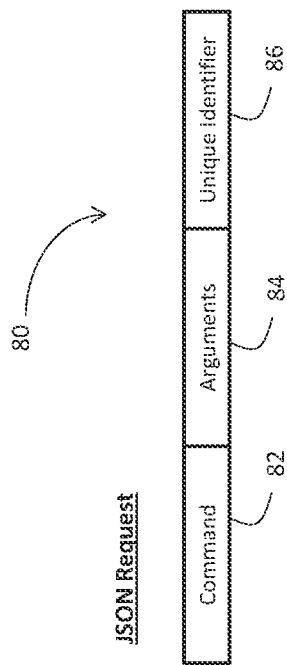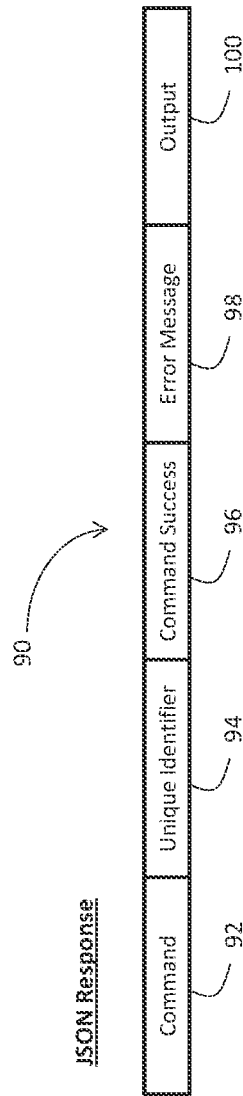

SYSTEM AND METHOD FOR AUTOMATED PROCESS ORCHESTRATION

CROSS-REFERENCES TO RELATED APPLICATIONS

This application is a continuation application of International Patent Application No. PCT/GB2020/053367 entitled "A SYSTEM AND METHOD FOR AUTOMATED PROCESS ORCHESTRATION," filed on Dec. 23, 2020, which claims priority to U.S. Provisional Patent Application No. 62/952,957, filed on Dec. 23, 2019, all of which are herein incorporated by reference in their entirety for all purposes.

FIELD OF THE INVENTION

The present invention relates to a system and method for enabling automated process orchestration, namely the control by an automated script or program running on one computer system of a remote process occurring on a remotely located computer system via a communications link. One of the most well-known forms of automated process orchestration is Robotic Process Automation (RPA) of interactions with software applications. More specifically, though not exclusively, the present invention relates to a system and method for enabling software processes on a remote desktop environment to be performed in an automated manner by a virtual worker on a remote process automation platform which itself is located remotely from the remote desktop environment. The present invention has application in instances both where the automation of tasks is initiated by a dedicated Robotic Process Automation platform application, an automated application which is accessed via a web browser, automated script execution or an application UAT (User Acceptance Testing) tool.

BACKGROUND OF THE INVENTION

Many processes involved in day-to-day work life are now conducted digitally on local and networked computer systems. Included within these processes are mundane and repetitive tasks which typically a human is required to process, even when the nature of these tasks is reasonably straightforward. Examples of such processes can be found in simple data entry tasks, where no transformative action is required by the human user or moving files between different locations in a file system. Whilst these are given as examples, it is to be appreciated that there are many other instances of actions which are similarly repetitive and do require any transformative intervention on the part of the user which necessitates that they must perform the task.

Tasks of this nature are suitable to be conducted by an automated robot worker (or virtual worker), since the tasks themselves follow a known routine, and the automated virtual worker can be programmed to perform these tasks reliably and accurately. Outsourcing of these tasks to an automated virtual worker typically enables these tasks to be performed more quickly than is possible when a user carries out the processes manually. Outsourcing in this manner also eliminates the possibility of human error due to tiredness or lack of knowledge of how the task is to be performed correctly. Eliminating the need for human users to perform these tasks also enables these users to be free to perform different tasks which are not suitable for automation.

The assignment of these tasks to automated virtual workers is often classed as Remote Process Automation (RPA). In addition to the benefits noted above, the use of RPA in conducting automated tasks such as those highlighted above also advantageously are able to use artificial intelligence (AI) and machine learning capabilities to learn how to handle high-volume, repeatable tasks that previously required humans to perform. These tasks can include queries, calculations and maintenance of records and transactions.

In recent years, there has been a shift to utilising the power of distributed processing particularly in the use of RPA technology. Typically, this manifests itself as devolving the execution of processes that would be carried out at a local site to a connected remote site where multiple processes can be automated and the results provided back to the local site. Clearly such devolved processing has advantages such as improving management of automated processes which for example would only need to be managed at a single remote site rather than at multiple sites; improving accessibility to RPA which could be accessed from multiple different sites and also improving scalability of RPA processes. Typically, RPA technology of this type may be located in and accessed via cloud-based computing.

RPA technology typically enables automated processes to be carried out in a manner which requires no on-premises infrastructure, allows for reduced infrastructure maintenance and may utilise subscription models. However, these solutions introduce other technical challenges. When automating on-premises systems and applications, cloud-based RPA virtual workers require access to these from the Cloud via technologies such as Virtual Private Networks (VPNs). Whilst this in itself is not typically a barrier, other access requirements can be, such as the opening of firewall ports, additional Active Directory (AD) Group Policies and perhaps most intrusive, the joining of the Virtual Worker to the organisations Active Directory Domain.

The following requirements are typical for a cloud-based RPA solution:
- A VPN from the software as a service (SaaS) RPA platform to the organisation.
- Lengthy firewall rules to ensure the RPA virtual worker cannot access systems on the on-premises systems and applications (i.e. the systems and applications of the end customer) which are not required by the automation. These rules would need to be revisited for each additional automation.
- The RPA virtual worker typically needs to be joined to the organisation's Active Directory (AD) domain.
- Internal software needs to be installed on the RPA virtual worker (unless the automation is entirely web browser and web Application Programming Interface (API) based).
- Customer data related to the automation activity will need to be available to the virtual worker (for example to load into Excel)
- The virtual worker AD account will potentially need to perform email activities and hence it is common for Outlook to be installed and configured on the virtual worker.
- A large number of AD Group Policies are typically required on the virtual worker to enable automations to operate without unwanted distractions from the Operating System.
- The customer's security software (including Anti-Virus) would need to be installed on the Virtual Worker.

It is also to be appreciated that RPA can be used in an on-premises situation. Sometimes the target applications are hosted on a remote server which is not in the cloud and remote desktop technologies such as Citrix and Microsoft Remote Desktop (RDS) can be used to provide access to the applications which are not local to the virtual worker. In these cases, the solutions still suffer from similar problems.

These requirements result in a significant amount of time and effort being invested up-front from both the supplier of the RPA solution and IT teams at the customer, where time can often be scarce. In addition, cloud-based RPA inherently is insecure in that it is always susceptible to security breaches. Accordingly, it is unsurprising to see that these requirements often raise security flags with customer Information Security teams which can take months to work through and can result in organisations abandoning the process altogether.

An alternative to cloud-based RPA solutions which suffer from security weaknesses, is the use of remote desktop technology to create a connection from the cloud-based RPA solution to an on-premises server or pool of servers. Remote desktop connections are easy to setup with minimal firewall or security changes and customers typically have such a system already in-place to facilitate remote working. With the use of remote desktop technologies such as Citrix and Microsoft Remote Desktop Services (RDS) being prevalent within organisations, the adaptation of these technologies for RPA is logical and addresses the security issues of cloud-based RPA solutions as remote desktop technology is more secure solution. However, there are further technical issues which make RPA using remote desktop technology less than ideal.

RPA is generally used by all sizes of organisation as a holistic automation platform which can be used to interact with applications at an API level or through direct screen interaction where needed. However, one area which RPA vendors have struggled to address is that automation over remote sessions, such as Citrix or Microsoft RDS, where APIs cannot be leveraged and interacting with applications via Windows user interface APIs is impossible. Because of the way in which Citrix and RDS present Windows and applications via screen images through remote sessions, RPA is not able to leverage standard methods, instead resorting to what is termed as Surface Automation—image-based automation which is effectively screen scraping. The remote session communications channels are asymmetric in that a multitude of dedicated channels for transmitting user interactions with a GUI are provided in one direction (low bandwidth) and output in response to that interaction (such as Video) is provided in the other direction (high bandwidth). Surface Automation introduces the following challenges amongst others:

- Elements which are off-screen, e.g. in a web page or word processing document, are invisible and the automation has to continually scroll up and down to locate the element.
- Windows which appear behind other windows are invisible to the automation.
- API and code objects are unavailable so even simple tasks such as detecting the existence of a file become complicated.
- Typically, over 95% of the built-in automation objects in an RPA system are unavailable in a remote session, and therefore the existing object library is rendered useless.

This introduces complications during the development of automated processes which can take 3 to 4 times longer to develop and therefore erodes the return on investment when identifying processes to automate.

In addition to this, once automated, processes which rely on Surface Automation are significantly less robust, increasing cost to manage and maintain, and introducing risk to the business. Maintenance of Surface Automation processes are subject to the following challenges:

- Extreme sensitivity to changes in the layout of a screen. Even minor updates to applications can disrupt the automated process, resulting in downtime and redevelopment effort.
- The rate of exceptions is much higher in a remote desktop session due to decreased reliability and ability to react to unexpected events.
- Protocol image compression (an automatic system designed to reduce bandwidth) causes the received image at the client to not be an exact copy of the real image which can differ between sessions depending on available bandwidth. This makes it harder to detect images and is usually resolved by increasing the tolerance which subsequently increases the risk of another similar image being mis-detected as the target image.

The increased cost of developing and maintaining processes which involve Surface Automation often results in organisations avoiding the automation of these processes altogether and therefore not realising as much return on their investment in the automation platform.

The present invention has been devised against this backdrop and seeks to address at least some of the above-described problems with existing systems.

BRIEF SUMMARY OF THE INVENTION

The present invention resides in the appreciation that the virtual channel, which is used in remote desktop technologies for transmitting user interaction (keyboard strokes, mouse movement, etc), at a local terminal (client terminal) to a remote location (central server) for updating a virtualisation of the operating environment at the central server, can also be used in a different manner to transmit commands for remote RPA operation. This in effect enables the existing remote desktop technology to be used as a form of API "proxy" or "transmitter" for processes occurring on the central server. Examples of the type of commands which can be sent are set out later and include file handling commands for example.

The instructions or commands transmitted as part of the present invention are distinguished from the above-described prior art user interaction by virtue of being application executable instructions which can be used as instructions in an automated process orchestration process rather than data which indicates graphical user interface interaction. Accordingly, the term 'instruction' or 'command' as used herein is directed to such application executable instructions which exclude data which merely relays user interaction with a graphical user interface. Another way of looking at this distinction is that the 'instructions' or 'commands' of the present embodiments are commands to perform API calls as opposed to relaying 'user' interaction with a graphical user interface (typically user interaction using a touchscreen, mouse, or keyboard). Further distinctions between commands and Surface Automation data are described later.

According to one aspect of the present invention there is provided a computer-implemented method of communicating with a remote application, the method comprising: establishing a remote desktop session between a first computing system and a second remotely located computing system having access to the remote application; the establishing step including setting up a virtual channel for communication of data relating to graphical user interface interactions at the first computing system to the second computing system; preparing a command for execution by the remote application, the command including a command identifier and being configured to require a response; transmitting the command for the remote application from the first computing system to the second computing system via the virtual channel; receiving the command at the second computing system and providing the command to the remote application seeking to execute the command; generating an execution response to the provision of the command to the remote application, the response including the command identifier; and sending the response to the first computing system via the virtual channel.

It is to be appreciated that the 'remote application' can be any application accessible to the second computer system but also, in some embodiments, can be the operating system of the second computer system itself. In this regard, the remote desktop server session on the second computer system acts to route the command to the appropriate location for execution.

It is further to be appreciated that the term 'remote desktop session' has a conventional meaning of a visual display session to a remote computer system whereby the user connects (and usually logs in) to that remote computer using a "remote session" program on their local computer (for example the Microsoft Remote Desktop Client or Citrix Workspace app) and the remote computer sends a live video feed/graphics of either its entire desktop (and applications within) or only of the running applications on the remote system (by simply omitting the elements of the video feed which show the desktop). Within this session the user can interact with the remote desktop (or applications within) using their local input/output devices such as local mouse or keyboard. Changes to mouse position or key presses are transmitted to the remote computer which, in response, will send updated video/graphics to show any changes in state. In the present application, this term is intended to have a broad meaning. For the avoidance of doubt, it is explicitly intended that the term 'remote desktop session' as used herein is not restricted to actually seeing the desktop itself. Rather client device may only see the remote application(s) with which it is interacting, which would appear to the user as though they were running on the client terminal device but would not be. In this case, as has been mentioned above, the operating system of the remote system may well just hide the desktop parts of what is seen at the client terminal device. For example, it is common for Citrix applications to be used in this way in what they term 'published applications' or 'seamless applications'. Such 'published' or 'seamless' applications would be covered by the term 'remote desktop sessions' as used herein.

In some embodiments, the establishing step comprises activating a command input interface at the first computer system and activating a command delivery interface at the second computer system, the command input interface and the command delivery interface communicating via the virtual channel.

In an embodiment, the establishing step comprises providing to the command delivery interface a link to an executable program for controlling the operation of the command delivery interface, the link being directed to a file share location on a file share data store. The advantages of non-installation of anything in the remote desktop server session have been described elsewhere.

The receiving, generating and sending steps may advantageously be controlled by the executable program provided at the file share location of the file share store.

The preparing step may comprise receiving the command in a first language of an application running on the first computer system and translating the command into a second language of the remote application.

In some embodiments the translating step comprises using an open input/output interface to translate the format of the command operable under a first operating system of the first computer system into a format of the command that is executable under a second operating system of the second remotely located computer system.

The translating step may comprise the open input/output interface operating a Simple Object Access Protocol (SOAP) messaging protocol and/or a Representation State Transfer (REST) messaging protocol. These two interfaces provide a wide variety of format conversion for an array of different applications.

The translating step may comprise using a set of predetermined types of commands stored in a local data store. In some embodiments the translating step comprises using a set of predetermined types of commands stored in a Dynamic Linked Library;

In some embodiments, the translating step comprises encoding the command prior to transmission and the receiving step comprises decoding the received command prior to the execution of the command. Such encoding helps to identify transmission errors and reduces the size of the transmissions.

The preparing step may comprise including arguments or parameters in the command which determine the operation of the command at the remote application.

In some embodiments, the preparing step comprises generating the command in a JavaScript Object Notation (JSON) format.

The receiving step may comprise comparing a type of the command against a list of acceptable types of commands and filtering out the command if it does not conform to a predetermined acceptable type of command. The advantages of this filtering process have been described elsewhere.

In some embodiments, the type of command comprises a new form command having an instruction which has not previously been known to the second computing system and the comparing step comprises determining if the new form command is permitted by the second computing system. This advantageously allows developers where permitted to create their own commands as has been described elsewhere.

In some embodiments, the method further comprises converting the received command into a plurality of subcommands representing the received command and the providing step comprises providing the sub commands to the remote application.

The method may also further comprise converting the format of received command at the second computing system into a format of the remote application before providing the remote command to the remote application. This reformatting allows the communications format to be optimised and not compromise the compatibility with the remote application for command execution.

In some embodiments, the generating step comprises generating the response to include a command success field indicating whether the command was successful or not.

The command may comprise executable code comprising a plurality of commands, and the generating step may comprise generating a response indicating whether the execution of code by the remote application was successful.

In some embodiments, the command comprises executable code for updating the remote application, and the response generated indicates whether the updating of the remote application was successful.

The generating step may comprise generating the response to include an output field providing an output generated by the remote application following execution of the command.

The method may further comprise providing a switching function at the first computing system, the switching function determining, in use, if the command needs to be executed locally or remotely, and if the command needs to be executed locally, then forwarding the command to a local application provided at the first computing system.

The method may further comprise receiving an instruction to generate the command from an RPA application, a browser application, a UAT application or an automated script.

In some embodiments, the method further comprises receiving the response to the command at the first computer system and using the received command identifier to match the response to the transmitted command.

In some embodiments, the method may further comprise using a webserver provided at the first computing system to configure the operation of the remote desktop session between the first and the second computing systems.

According to another aspect of the present invention there is provided A system for implementing an automated process orchestration with a remote application, the system comprising: a remote desktop client application at a first computing system and a remote desktop server session at a second computing system remotely located from the first computing system, the second computing system having access to the remote application, wherein the remote desktop client application and the remote desktop server session are configured to establish a remote desktop session between the first and second computing systems; the remote desktop session including a virtual channel for communication of data relating to graphical user interface interactions at the first computing system to the second computing system; the remote desktop client application being configured to prepare a command for execution by the remote application, the command including a command identifier and being configured to require a response; the remote desktop client application including a communications engine configured to transmit the command for the remote application to the second computing system via the virtual channel; the remote desktop server session including a receiver configured to receive the command; the remote desktop server session being configured to provide the command to the remote application seeking to execute the command; and to generate an execution response to the provision of the command to the remote application, the response including the command identifier; and the remote desktop server session further comprising a response engine configured to send the response to the first computing system via the virtual channel.

In some embodiments, the remote desktop client application comprises a command input interface and the remote desktop server session comprises a command delivery interface, the command input interface and the command delivery interface configured to communicate via the virtual channel.

The command input interface may comprise an open input/output interface configured to translate the format of the command operable under a first operating system of the first computer system into a format of the command that is executable under a second operating system of the second remotely located computer system.

In some embodiments, the open input/output interface operates a Simple Object Access Protocol (SOAP) messaging protocol and/or a Representation State Transfer (REST) messaging protocol.

In some embodiments, the first computer system comprises a data store which stores conversion data for translating the format of the command. This may be a DLL.

The command input interface may comprise a web server accessible via a web browser, the web server being configured to enable the command input interface to be configured by a user.

In some embodiments, the command delivery interface is configured to convert the received command into a plurality of sub-commands representing the received command and to provide at least some of the sub commands to the remote application.

The command delivery interface may be configured to convert the format of received command into a format of the remote application before providing the remote command to the remote application.

In some embodiments, the command delivery interface comprises a filtering function for filtering out specific types of commands previously specified as unallowable.

The above-described features of the embodiments are combinable in different ways and can be added to the following specific description of the embodiments of the present invention if not specifically described therein.

BRIEF DESCRIPTION OF THE DRAWINGS

In order that the invention may be more readily understood, reference will now be made, by way of example, to the accompanying drawings in which:

FIG. 3A is a schematic block diagram showing components of an instruction in the form of a JSON Request sent over a virtual channel of remote desktop server session of FIGS. 1A and 1B;

FIG. 3B is a schematic block diagram showing the components of a response to the instruction in the form of a JSON Response sent over the virtual channel shown in FIGS. 1A and 1B;

DETAILED DESCRIPTION OF THE INVENTION

Specific embodiments are now described with reference to the appended figures. These embodiments are directed to systems and methods for remote process orchestration. The term 'remote process orchestration' encompasses a multitude of automated processes can be controlled using the current embodiments. Examples of such remote process orchestration systems include RPA systems, automated browser-based interaction systems, UAT software testing systems and automated script or code execution systems. Furthermore, these embodiments can utilise any remote desktop technology such as Microsoft's Remote Desktop Service (RDS), Citrix or VMware Horizon View for example.

Figure 1A:
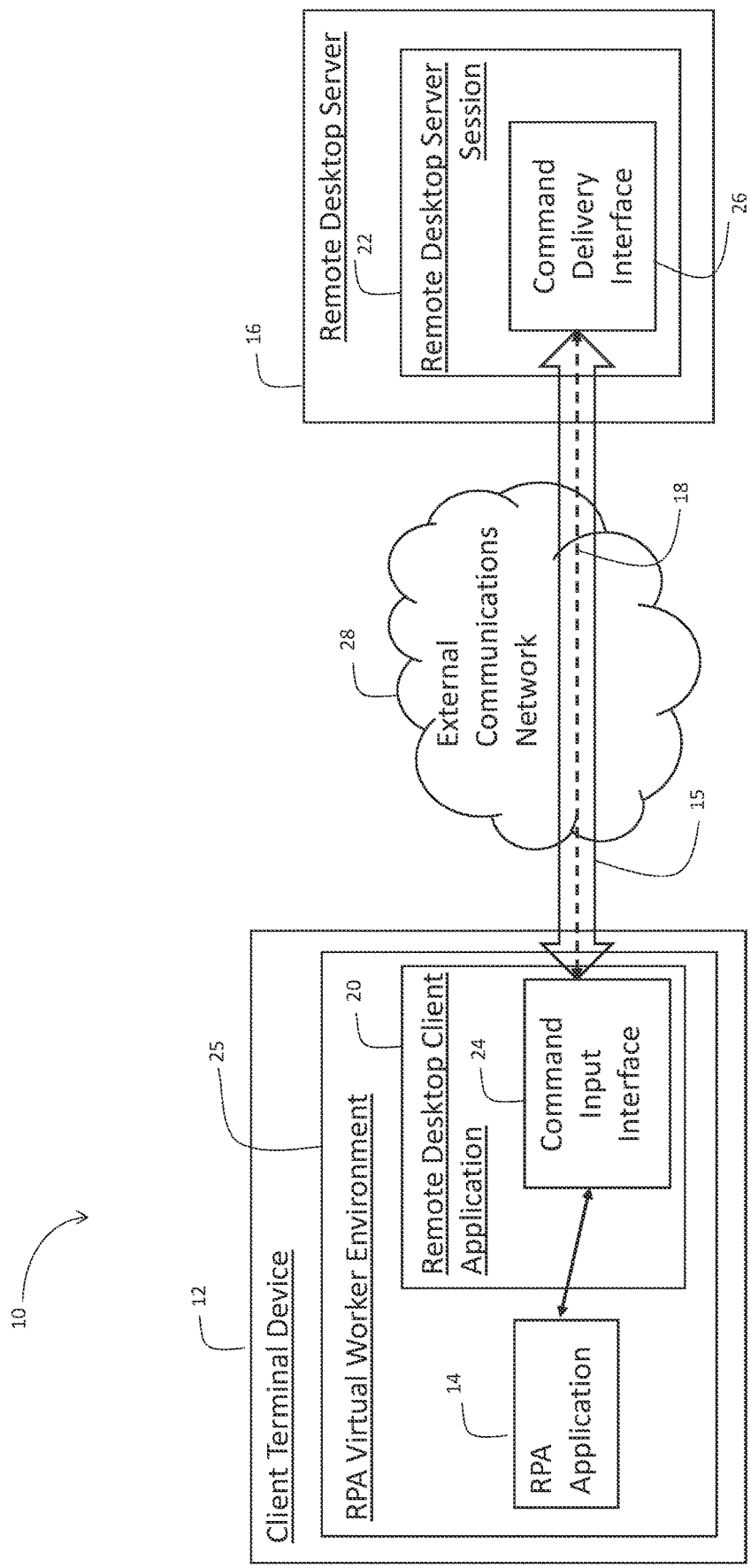
FIG. 1A is a schematic block diagram, illustrating an automated command system in accordance with an embodiment of the present invention, wherein the command interface system is used in combination with a remote process automation application.

Referring to FIG. 1A, there is shown a use scenario for an automated command system 10 according to an embodiment of the present invention, which is configured to receive commands from a Robotic Process Automation (RPA) application 14 on a client terminal device 12 and to cause these commands to be transmitted via a communications link 15 to and executed on a remote desktop server 16 from within a remote desktop server session. Whilst a single client terminal device 12 and single remote desktop server 16 are shown in FIG. 1A, it is to be understood that this is for illustrative purposes only and that multiple client terminal devices 12 and remote desktop servers 16 may be included as part of the automated command system 10.

The remote desktop session which is used is in accordance with known practices. In the embodiment shown in FIG. 1A, such a remote desktop session establishes a "virtual channel" 18 or "tunnel" within the communications link 15 between the client terminal device 12 and the remote desktop server 16, and more specifically, between a remote desktop client application 20 installed on the client terminal device 12 and a remote desktop server session 22 running on the remote desktop server 16. Whilst establishment of such virtual channels are known, these have previously been established to enable transmission of data representing user interaction with a graphical user interface of the client terminal device 12 to the remote desktop server 16. Such user interactions may comprise of keyboard strokes, mouse movement, mouse clicks etc. Typically, a dedicated virtual channel would be set up for each different type of user interaction, such as one for keystrokes and a different one running in parallel for mouse movement. This user interaction data would typically be used to update a virtualisation of the operating environment at the remote desktop server session 22. The updated virtualisation, or just the resultant changes, would then typically be transmitted back to the client terminal device 12 and changes caused by the user interaction with the graphical user interface would be displayed and further consequential user interaction may be captured. As is discussed above, when remote process automation is used over a remote desktop session in this manner it is typically necessary to use the above-described Surface Automation process. There are significant drawbacks to such an approach, as have been described previously.

In order to overcome these drawbacks when seeking to implement automated process orchestration such as RPA, the automated command system 10 of FIG. 1 is provided with a command input interface 24 (also known as IA-Connect Director) and a command delivery interface 26 (also known as IA-Connect Agent). The command input interface 24 is located within the remote desktop client application 20 and the command delivery interface 26 is located within the remote desktop server session 22. The command input interface 24 is configured to receive commands from the remote process automation application 14 to which it is communicably coupled, interpret them and then transmit these interpreted commands to the command delivery interface 26 using the established virtual channel 18. These commands are then executed in the remote desktop server session 22. The commands themselves may comprise the user interactions which are available in known systems. However, the commands may additionally comprise direct executable commands to the file system of the remote desktop server session 22 or applications and web browsers in the remote desktop server session 22. For example, the commands to be executed may comprise performing an API call, running a program, inputting data into an application or web browser, moving the mouse or any other mechanism required to fulfil the command. Such direct commands are not available in known systems due to the limitation of only being able to use the virtual channel 18 to transmit data pertaining to real-time user interactions with a graphical user interface.

One characteristic of such commands according to the present embodiments is that they always take the form of a request from the command input interface and always illicit a corresponding response to that request from the command delivery interface back to the command input interface. Another characteristic is that the commands of the present embodiments are directed to be executed in either the remote application or in the operating system hosting the Remote Desktop server session. In this regard, the command is routed by the remote desktop server session to the appropriate API where it is to be executed, which differentiates it from the Surface Automation prior art. In the Surface Automation prior art systems, data transmitted by the virtual channel is intended to be consumed by the remote desktop server session to emulate interaction with a graphical user interface occurring on the client terminal device as though that interaction was occurring at the remote desktop server. It is to be appreciated that the term 'session' is intended to define a temporary and interactive information interchange between two or more communicating devices and an established communication session typically involves more than one message in each direction. Types of commands which are transmitted over the virtual channel include 'run a program', 'copy a file' and 'enter data into an application' (though this is not the same as Surface Automation where the interaction is blindly mapped from one domain into another but rather is an explicit command to enter data into the application).

The use of the virtual channel 18 to send commands avoids the need to use Surface Automation. By way of example, the commands sent may be used in the following automated scenarios:

a) Microsoft Office automation (for office-related applications such as Excel, Word, PowerPoint and Outlook);

b) Web browser automation (for internet browsers such as Chrome and Internet Explorer/Edge);
c) Launch applications (which help to locate and start other computer programs);
d) Interact with applications using the Microsoft Win32 and UIA APIs (e.g. enter text, press buttons, click menus) which in turn illicit a response in the application. Whilst this may superficially seem similar to the prior art methods, the distinction is that the present embodiments do not need to perform all of these actions by looking at screen graphics, interpreting what is presented and in response moving the mouse and pressing keys on the keyboard (which makes use of existing virtual channels). Rather, the present embodiments simply make use of existing API/programmatic interfaces on the remote system to perform the actions directly on the remote application (e.g. "press button X" where button X is an element known to the remote system). This differs from moving the mouse over the pixels which represent a button (assuming that the 'operator' has successfully detected the pixels which represent the correct button) and then pressing the left mouse button. This latter manner of implementation also disadvantageously runs the risk of error due to misdetection of the pixels. It is to be appreciated that all Windows Operating Systems have an internal "map" of all windows, dialogs and elements (e.g., buttons, checkboxes, menus) and each item has identifiable attributes (e.g., a unique identifier) none of which is visible to the user (either locally or over a remote session) but which can be used to directly refer to that element in a command.
e) File management within the Remote Session (namely to file operations within the remote environment itself or across the external communications network (i.e., across the virtual channel). In some embodiments, for security reasons, a user may wish to restrict to only file operations within the remote environment but not across external communications network, but this is a configuration choice).
f) Environmental actions (e.g. move mouse, press keys, set default printer). These differ from the conventional environmental actions because they avoid coordinate mapping issues. For example, in the prior art implementations, a mouse move from the local/client terminal device (e.g. from a human or from an RPA application using Surface Automation) is taking place on the local/client terminal device and then being mapped into the remote session if the mouse is over a part of the screen that maps to that remote session. This makes calculations relating to mouse positions more complicated because it requires a mapping of local and remote screen coordinates which typically do not uniformly overlap. The present embodiments obviate this problem by issuing a direct command to move to a particular location or press a specific key for example. So, by issuing mouse coordinates over the virtual channel 18, the command provided instructs the remote system to move its "virtual" mouse to a particular remote position without having to map local coordinates to remote coordinates.
g) PowerShell automation using a powerful set of included objects for general PowerShell, Active Directory, Azure AD, Exchange, Office 365 and Skype;
h) API calls to external web services (if required as part of the automation); Automatic updates/code enhancements over the virtual channel. The command delivery interface in the form of an executable file (EXE) can receive new commands/new versions of its "firmware" over the virtual channel. This allows the automation developer to easily use any version of the command input interface 24 and the command delivery interface 26 (newer or older) or add their own features without any changes to the command delivery interface 26 EXE on the remote computer system. Effectively once any version of the command delivery interface EXE has been made available on the remote computer system, it is possible to enhance its functionality without needing to contact the administrators of the remote system. The new code is sent within the JSON request message (80—see FIG. 3A) over the virtual channel 18, so the JSON request 80 is used to either a) ask the remote command delivery interface 26 to run commands or b) Inform the remote command delivery interface 26 of new commands. This latter option is important to development of (enhancement/extension of) the library of commands which the system is configured to implement. The term 'code' as used herein, simply refers to a plurality of executable commands (instructions) in any computer language, which can be interpreted and executed by an operating system. Examples of code languages are PowerShell, VisualBasic, C, C++, and C#.
i) Use dynamic code objects allowing developers to write and execute their own custom code. This allows a user of the present embodiments to write their own code and the command delivery interface 26 will run it for them on the remote computer system. The custom code is sent over the virtual channel 18 in source code or binary format over the virtual channel and the command delivery interface 26 will run it (without anything being changed on the remote computer system). The new code can be sent within a JSON request message 80 over the virtual channel 18, so the JSON request message 80 is used to either a) ask the remote command delivery interface 26 to run commands that the command delivery interface knows or b) ask the command delivery interface 26 to run a command where the command code itself is held in the JSON request message 80.

It is to be appreciated that the above list is for illustration purposes and is not intended to be exhaustive and that it is within the capabilities of a person skilled in the field to expand upon this list. For the purposes of brevity, the details regarding the implementation of coding to achieve the above commands will not be provided since it is to be appreciated that the skilled addressee will readily be able to adapt the basic configuration of the system to carry out described functionality without requiring detailed explanation of how this would be achieved. However, further details regarding the structuring of commands to be sent using the automated command system 10 will be discussed further with reference to FIGS. 3A, 3B and 4.

In addition, the automated command system 10 is further configured to utilise the virtual channel 18 to send the results of commands, which have been transmitted from the command input interface 24 to the command delivery interface 26, back to the command interface 24 and ultimately back to the remote process automation application 14. Such results may comprise a notification that the executed command was successful or an error code if the command was not executed successfully. In some cases, the initially transmitted command may generate an output (such as in the case where the command is a request for a value of a particular item in a spreadsheet). In these cases, the results transmitted back to the command input interface 24 comprise the requested output, in addition to a notification that the executed command was successful. Further information regarding this process is provided with reference to FIGS. 3A, 3B and 4.

As discussed above, the command input interface 24 is located on the client terminal device 12. In particular, the command input interface typically resides within the remote desktop client application 20, which in turn is provided within an RPA virtual worker environment 25. In order for the command input interface 24 to operate, it is also necessary to install some functional aspects on the client terminal device 12 itself. This arrangement will be described further with reference to FIG. 5.

In contrast to the command input interface 24, the command delivery interface 26 is designed to be as unobtrusive as possible. In order to achieve this, the command delivery interface 26 is designed to reside within the remote desktop server session 22 as an executable application which does not require installation within the remote desktop server 16 directly. Such an arrangement means that the deployment of the automated command system 10 does not require any direct access to the remote desktop server 16, increasing ease of usability of the automated command system 10. In particular, it does not require local administration rights, installation or registration and simply executes in the remote desktop server session 22 with standard user rights. This arrangement will be described further with reference to FIG. 6.

The command input interface 24 and command delivery interface components 26 may be arranged to communicate via any remote desktop technology virtual channel 18 such as a Microsoft RDP (Remote Desktop Protocol) or Citrix ICA (Independent Computing Architecture) virtual channel 18. Such arrangements use the same network socket used for the remote desktop session and hence does not require any additional firewall rules or network configuration to achieve. In the Citrix scenario, gateways such as Citrix NetScaler or Citrix Cloud Gateway services automatically forward the virtual channel without any additional configuration since the virtual channel 18 is a component of the existing Citrix ICA session. Whilst Microsoft RDP and Citrix ICA are given as examples, it is to be understood that this is for illustrative purposes only, and that the automated command system 10 is intended to be usable with any suitably configured remote desktop service providers.

Leveraging this automated command system 10 and install arrangements, it is possible to utilise existing remote desktop technology Citrix/general RDS infrastructures to connect to internal applications and systems, eliminating the lengthy process of setting up VPN's, Group Polices etc, and removing Information Security concerns associated with cloud-based remote process automation applications 14 having access to internal systems. Where an existing remote session infrastructure is not in place, a dedicated remote desktop infrastructure can be implemented relatively quickly.

In particular, the automated command system 10 enables the provision of increased security for users of the system 10 when compared to known methods. In particular, the advantages include:

No direct access between the remote process automation application 14 and the organisation's internal applications.

Simpler firewall rules. The automated command system 10 does not require any additional firewall rules beyond those required for the remote desktop technology sessions, such as Microsoft RDP or Citrix ICA (or general) remote desktop sessions, since the communication virtual channel runs down the same TCP socket already in-place and used for a display, keyboard and mouse.

The client terminal device 12 does not need to be joined to the organisation's Active Directory Domain.

Internal software does not need to be installed on the client terminal device 12.

An AD account will still be required for running the automations, but this AD account will be used for logging into the organisation's remote desktop/Citrix environment only.

The organisation's own hardened Operating System build can be used without the need to change the Operating System on the client terminal device 12.

Sensitive files and data are not exposed to the client terminal device 12. The client terminal device 12 has limited access to some elements of data (e.g. values in certain Excel cells) as it performs automation activities, but these are held in memory and purged when the automation moves to the next step.

If email activities are required, Outlook would only need to be installed on the remote desktop/Citrix environment and not on the client terminal device 12, therefore email caching does not become an issue.

A smaller number of custom Group Policy Objects (GPOs) will be required and hence the remote desktop environment will more closely match the standard environment/build. A few user GPOs may be required to reduce unwanted popups/dialogs which would hinder or make a robotic automation more complex.

If required, any passwords required for automation (e.g. passwords for Excel spreadsheets, passwords to launch an application) can be held customer-side and hence will be unknown to the client terminal device 12.

Furthermore, the automated command system 10 of the present embodiments is designed to be unobtrusive, by using the existing remote desktop technology infrastructure. Further unobtrusive features lead to the following advantages in respect of the command delivery interface 26:

The command delivery interface 26 does not need to be installed on the remote desktop server 16. It does not need to be registered and can simply reside on a network share (see FIG. 6.

The command delivery interface 26 is standalone—there is no additional installation of .DLLs (Dynamic Linked Libraries).

Runs as the user account used to connect to the remote desktop session and hence cannot perform any activities beyond those the user account has permissions to perform—improves security.

Can only perform commands issued from the client terminal device 12 down the remote desktop technology virtual channel 18 (such as the RDP or ICA virtual channel 18). It will not respond to any other external factors since it has no open Transmission Control Protocol (TCP) ports, named pipes or any other means of communication. This makes it more secure.

Is fully controllable by the remote desktop server 16 environment. An AD Group Policy can be used to whitelist and/or blacklist any of the commands which the command delivery interface 26 is capable of performing. In other words, each remote desktop session has an allow list of commands that it considers to be acceptable (allowable to be used—whitelisted) and/or a deny list of commands which it considers are not acceptable (not allowed to be used—blacklisted).

These one or two lists can be applied to the remote system in several different ways, the most common being specified in an AD Group Policy. This list or lists can be used by the command delivery interface 26 to filter out commands received from the command input interface 24 such that they do not get executed. This advantageously provides complete control of what types of commands can be executed by the remote computer system and therefore improves the security of the system. It is also to be appreciated that one of the types of commands which can be placed on the allow or deny list can be a type of command which permits custom code to be written. In this regard, the remote computing system via an AD Group Policy can determine whether or not to allow such updating/coding to occur.

- When implemented using RDP or Citrix, the present embodiments do not require the Citrix or RDP clipboard or drive redirection virtual channels and it is possible to switch these off to enhance security.
- Stores no data on disk. All automation activities are stored in memory only, on the internal remote desktop server 16.
- Cannot copy files from the end user environment to the client terminal device 12 (this restriction is optional and is configuration and implementation dependent, though it can be advantageous in certain high security applications).

Typically, where a remote desktop session in accordance with the embodiment is initiated, the client terminal device 12 and the remote desktop server 16 are located remotely from one another. As such, transmission of commands from the client terminal device 12 and the remote desktop server 16 are enabled via an external communications network 28 (see FIGS. 1A, 1B and 2). Such an external communications network 28 may comprise any network capable of supporting suitable wireless or wired communication methods. It is to be appreciated that it may be possible in alternative embodiments that the client terminal device 12 and the remote desktop server 16 are located proximate to one another. In such cases, the client terminal device 12 and the remote desktop server 16 are communicably coupled directly without the need for the external communications network 28.

Figure 1B:
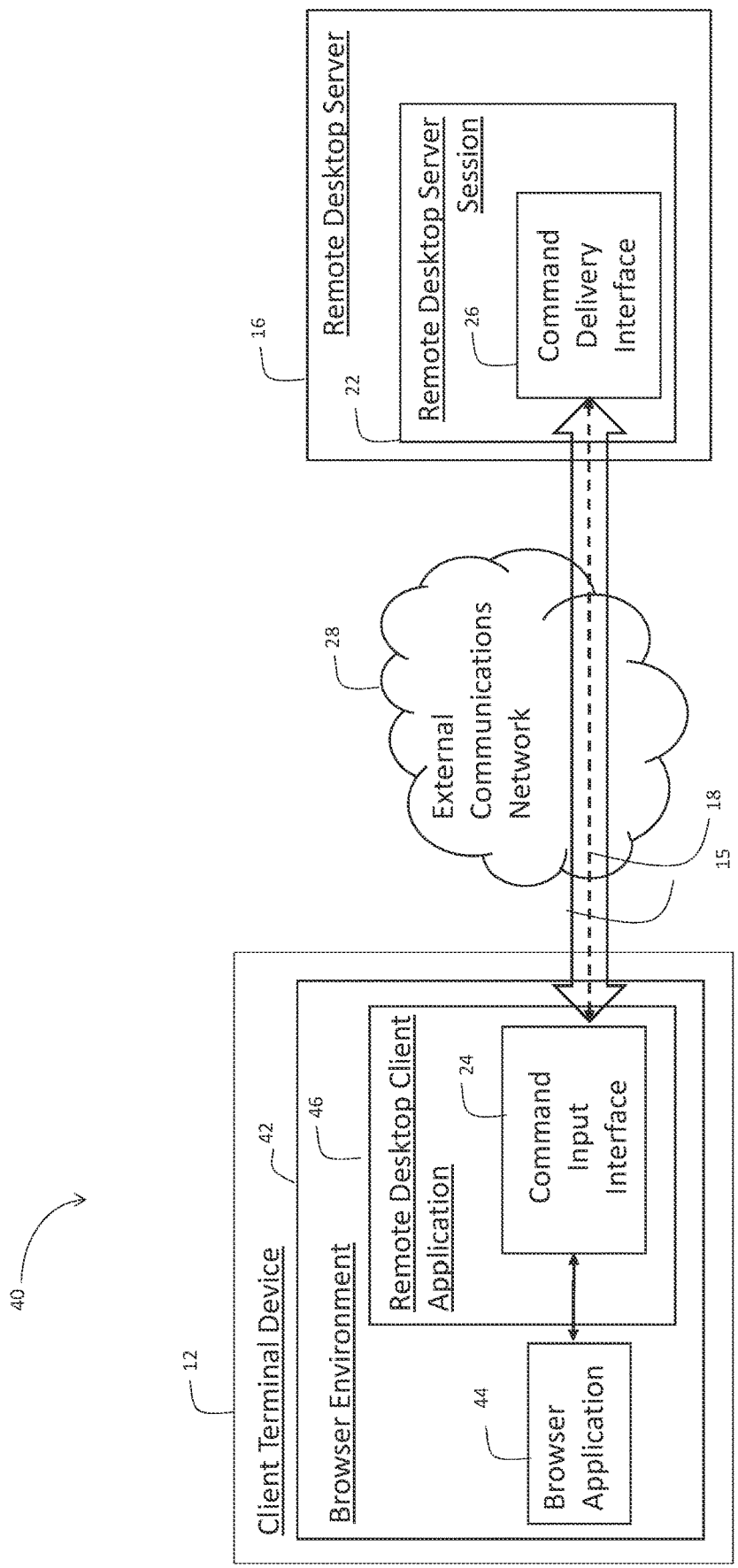
FIG. 1B is a schematic block diagram illustrating a command interface system in accordance with another embodiment of the present invention, wherein the command interface system is used in combination with a web browser-based application.

Turning now to FIG. 1B, there is shown a use scenario for an automated command system 40 according to an embodiment of the present invention, which is configured to receive commands from within a web browser environment 42 from a browser-based application 44 and to cause these commands to be transmitted to and executed on a remote desktop server 16 from within a browser-based remote desktop session. Whilst a single browser environment 42, browser-based application 44 and remote desktop server 16 are shown in FIG. 1B, it is to be understood that this is for illustrative purposes only and that multiple web browsers 30, browser applications 44 and remote desktop servers 16 may be included as part of the automated command system 40.

It is to be appreciated that whilst the browser-based application 14 is launched from within a browser environment 42, the browser environment itself will typically be launched from within a client terminal device 12 of a similar type to the client terminal device 12 of FIG. 1A. The difference between the two embodiments is that in the embodiment of FIG. 1B, the application 24 which issues commands is within a browser environment 42 whereas the application of FIG. 1A is launched from an application 14 directly installed on the client terminal device 12 which creates an RPA virtual worker environment 25.

The automated command system 40 of FIG. 1B is configured to function in a similar manner to the automated command system 10 illustrated in FIG. 1A and is able to transmit executable commands of the type highlighted above between a command input interface 24 and a command delivery interface 26, and to transmit the results of the executable command back to the command input interface 24. In the embodiment of FIG. 1B however, the remote desktop session is established and is controlled by a web browser-based automation application 44 as opposed to an RPA application 14 installed on a client terminal device 12 as in the embodiment of FIG. 1A. The web browser-based automation application 44 is another example of an automated process orchestration process. In the embodiment of FIG. 1B, commands are received by the command input interface 24 from the web browser-based automation application 44 to which it is communicably coupled. The web browser-based automation application 44 performs in a functionally similar manner to the application installed on a client terminal device 12 of FIG. 1A to supply commands and receive results from the execution of these commands but may be performed from within a web browser environment 42. This may be beneficial in instances where the automated supply of commands should be provided from a plurality of locations as opposed to a single client terminal device 12 with an installed application. It is to be appreciated that the remaining features of the embodiment of FIG. 1B are similarly arranged to those described with respect to FIG. 1A and for the purposes of brevity will not be described again here. Further description regarding the similarities and differences between the embodiments of FIGS. 1A and 1B will be given with reference to FIG. 2.

Figure 1C:
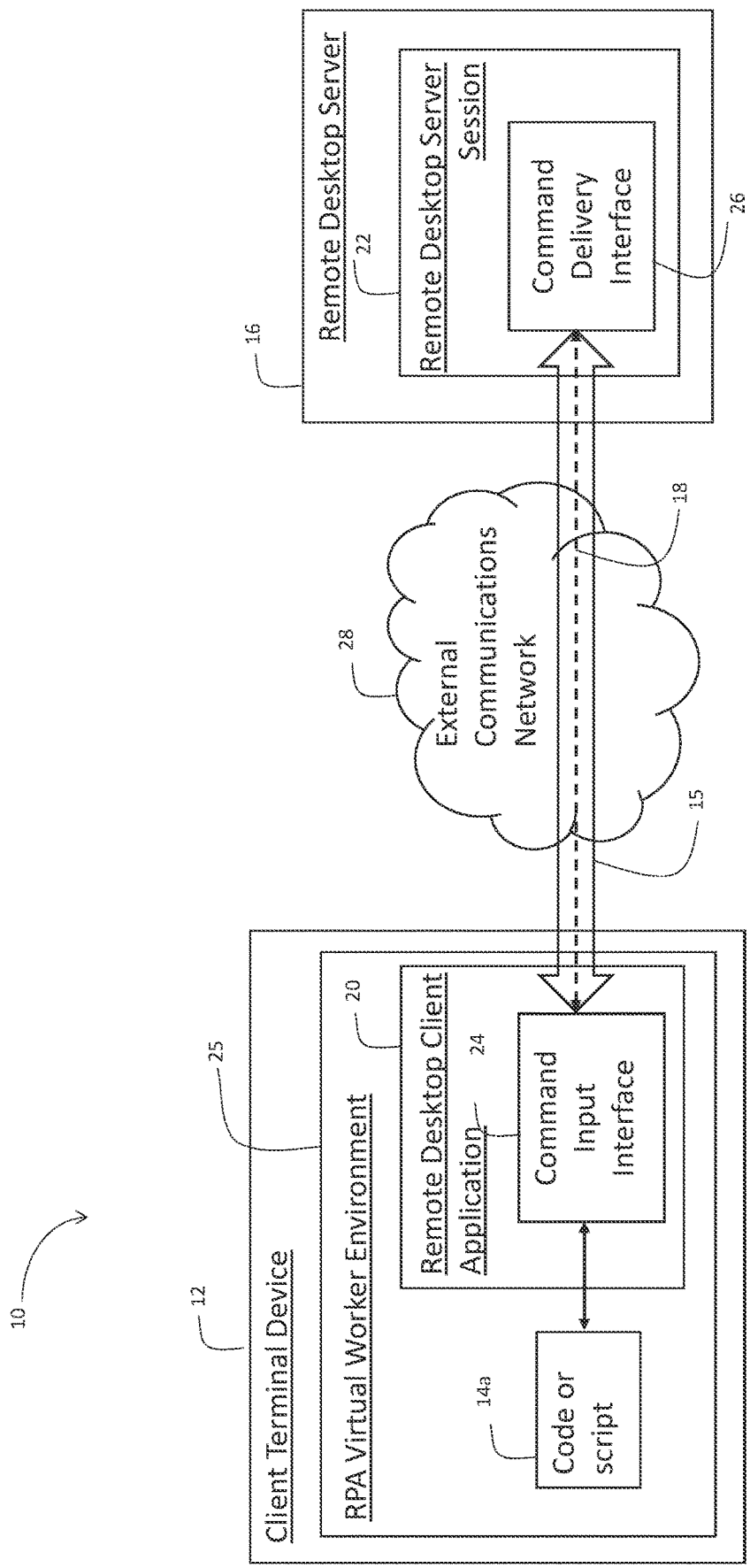
FIG. 1C is a schematic block diagram, illustrating an automated command system in accordance with an embodiment of the present invention, wherein the command interface system is used in combination with a script to perform remote orchestration of the remote applications.
Figure 1D:
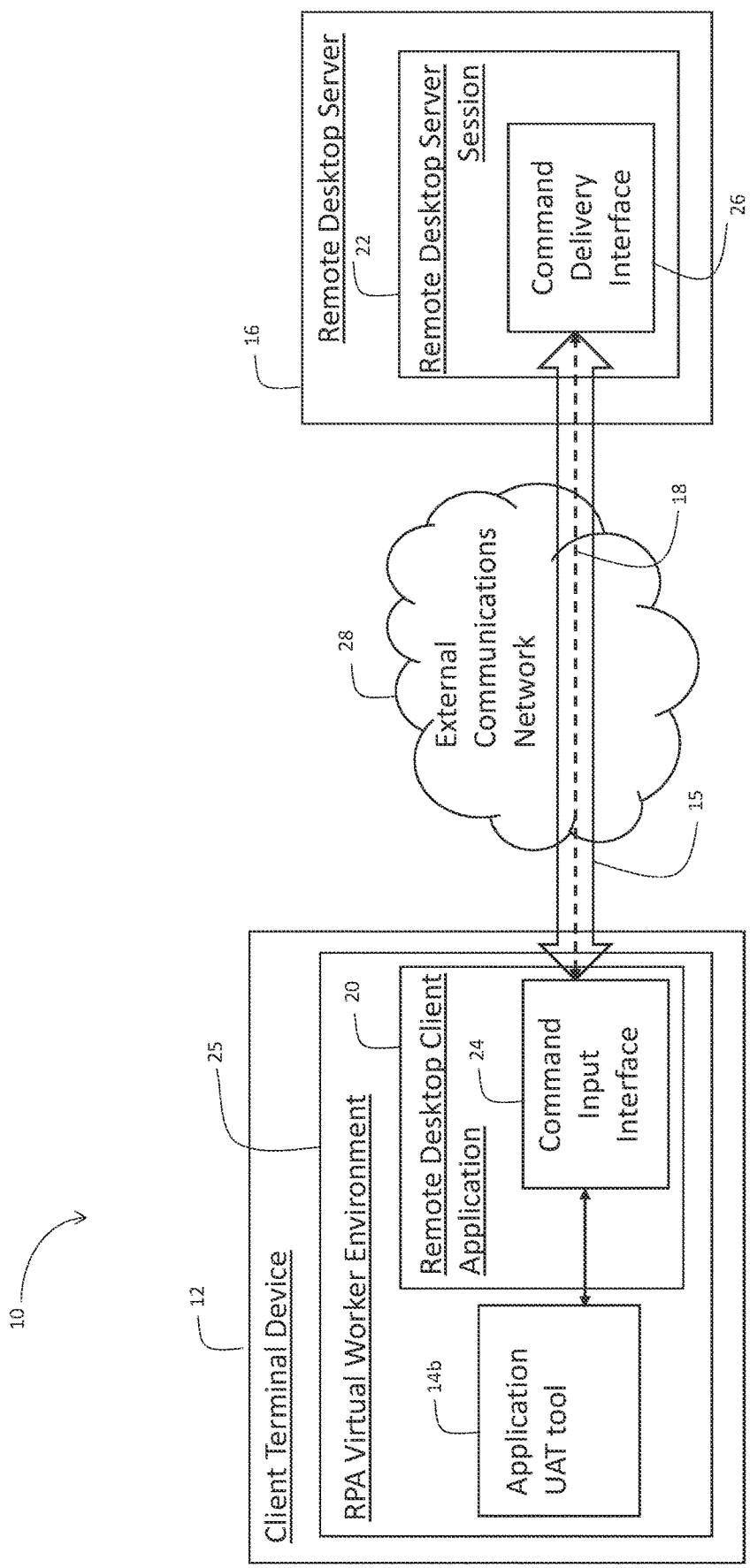
FIG. 1D is a schematic block diagram illustrating a command interface system in accordance with another embodiment of the present invention, wherein the command interface system is used in combination with a User Acceptance Testing (UAT) software testing tool.

Furthermore, it is to be appreciated that because of the generic nature of the API used withing the automated commands system 10 (see SOAP/REST API described later in FIG. 5) it is possible to use the current automated command system 10 with a different application to the RPA application 14 and the web-based automation application 44 described above. For example, it is possible in another embodiment to replace the RPA application 14 of FIG. 1A with a script 14a that will perform the orchestration of the remote applications. Similarly, in another embodiment it is possible to replace the RPA application 14 of FIG. 1A with a UAT (User Acceptance Testing) software testing tool 14b. Here the UAT software tool would test whether the application being tested meets the requirements of the user or not. Both of these possible embodiments are illustrated in FIGS. 1C and 1D respectively. Both of these embodiments use the same functionality as described above and herein but without using a dedicated RPA application 14. The advantages of the present invention are still realised in these different applications, which also would use the virtual channel 18 for commands as defined herein to access remotely located applications and perform automated process orchestration.

Figure 2:
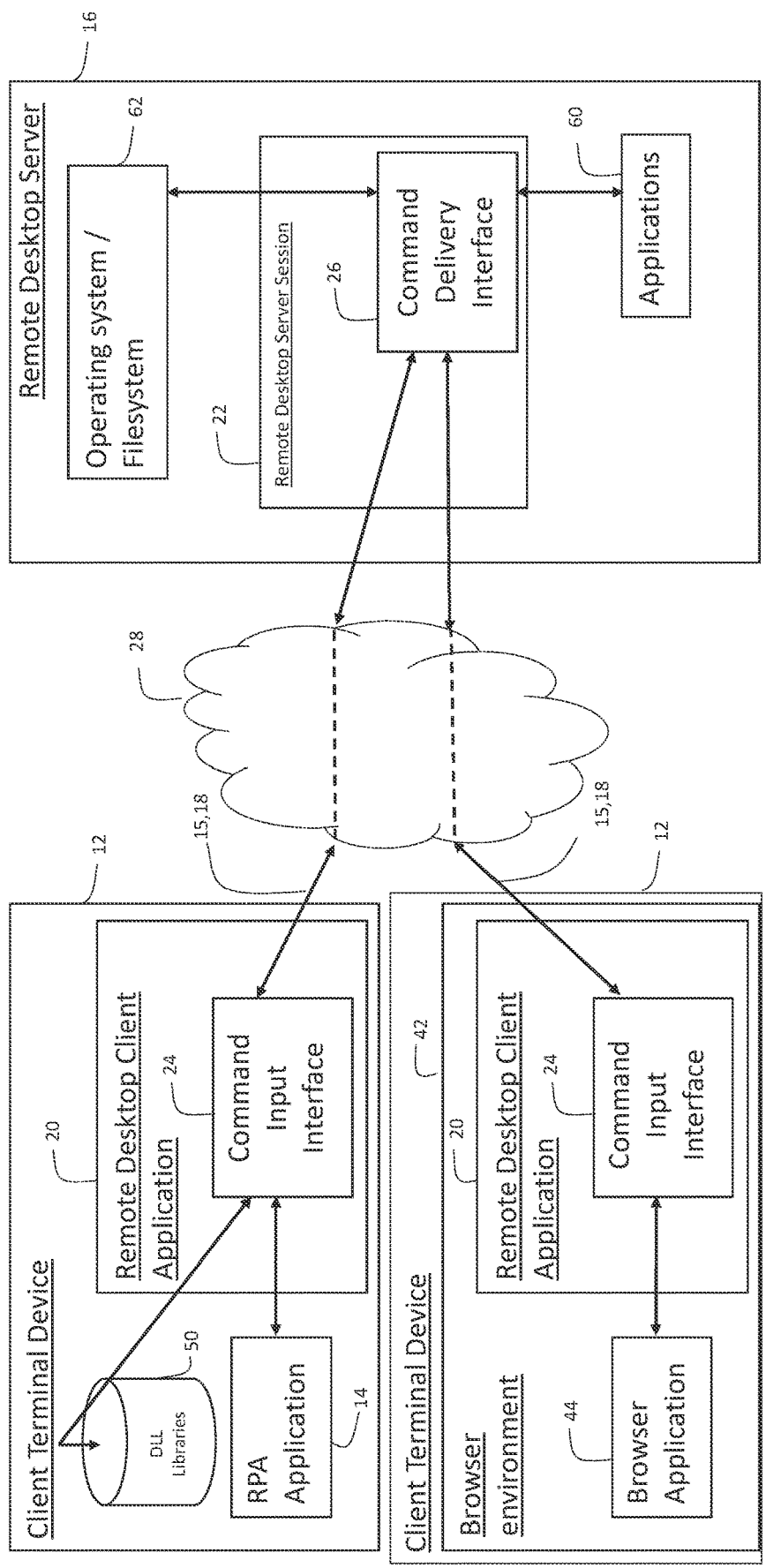
FIG. 2 is a schematic block diagram showing the structure of the systems of FIGS. 1A and 1B in greater detail.

Referring now to FIG. 2, there is shown a more detailed use scenario according to embodiments of the present invention. In particular, FIG. 2 illustrates in more detail aspects of both of the embodiments of FIGS. 1A and 1B. As can be seen the two different types of automated command system 10, 40 are shown; namely an automated command system 10 which utilises an RPA application 14 installed on a client terminal device 12 and an automated command system 40 which utilises a browser-based application 44 to issue commands from within a browser environment 42. As illustrated, both of these examples have a command input interface 24 provided whose function is to act as an effective API into applications running at the remote desktop server 16 end of the respective systems 10, 40.

Referring firstly to the client terminal device implementation 12, the command input interface 24 receives remote process automation "process flows" from the RPA application 14 on the client terminal device 12. These process flows will typically comprise commands which are intended for execution on the remote desktop server session 22. The commands will typically be received by the command input interface 24 from the RPA application 14 using a Simple Object Access Protocol (SOAP) API interface (134—see FIG. 5). Whilst a SOAP API interface is specified, it is to be appreciated that any appropriate protocol which enables the system 10, 40 to achieve its desired functionality may be used. Once the commands have been received using a suitable protocol language, these commands are sent to the command delivery interface 26, typically using the external communications network 28.

In some unseen embodiments, the RPA application 14 may also be configured to provide automated commands to be run on applications which are installed on the client terminal device 12. In this regard, the command input interface 24 may be configured to act as a switch which in one configuration enables automated process orchestration to occur on the remotely located computer system but in another configuration does not access the remote session virtual channel but rather acts on applications which are now found on the local computer system environment. In this case, the command input interface 24 may be updated with information about the applications available locally at the client terminal device 12 and any prioritisation or local applications as compared to remotely located applications. This is particularly helpful to developers who can use the remote process orchestration via the remote session virtual channel 18 to develop an automated application and when this was working correctly then run those tested applications locally using local resources without having to reconfigure the automated process orchestration application. Conversely, this also provides developers with the flexibility to develop processes on locally installed applications before switching to remote applications for testing. It also ensures that processes do not need to be redeveloped if an application's architecture changes from local to remote or vice versa. In these embodiments, the RPA application 14 may provide within a particular command structure whether the automated process should be conducted on a locally installed application or whether it should be provided to the command input interface 24 for transmission to a remote desktop server 16. In the case where a command is provided to the command input interface 24 for a locally installed application, the command input interface 24 may return an error or alternatively may be configured to send the command to the relevant locally installed application for execution.

Referring to the browser-based application 44 implementation also shown in FIGS. 1B and 2, the command input interface 24 will receive process flows as described above from the browser-based application 44 within the browser environment 42. In these scenarios, the command input interface 24 receives the process flows from the browser-based application 44, and will typically use a Representational State Transfer (REST) API interface (136—see FIG. 5) to accept the process flows. However, as noted above, it is to be appreciated that any appropriate protocol which enables the system 10, 40 to achieve its desired functionality may be used. As above, once the commands and/or process flows have been received, these are sent to the command delivery interface 26, typically using the external communications network 28.

Returning to the embodiment of FIG. 2, in both the client terminal device and browser-based application 44 implementations, it is necessary to send the commands received by the command input interface 24 to the command delivery interface 26 in a format which can be interpreted by the command delivery interface 26 and subsequently executed on the remote desktop server session 22. To achieve this, the command input interface 24 is configured to translate the received commands into a format suitable to be executed for the application that the command relates to (i.e. for a particular program, web browser, file operating system etc). Following this, the translated commands are encrypted to prevent unwanted interception of the commands from a third party. These encrypted commands are then sent to the command delivery interface 26 in this embodiment using a JSON format as JSON Requests. In response to each of these commands, a JSON Response is provided by the Command delivery interface 26. The structure of these communications is shown in FIGS. 3A and 3B and is discussed later. It is to be appreciated that whilst JSON requests are specified as a suitable request format, any suitably configured request format may be used such as XML or YAML as these are good examples of languages where it is possible to serialise or deserialise data. In another embodiment, the JSON format could be replaced by sending instructions and data in a non-textual structure for example as binary data. In another embodiment, it is possible to create a proprietary language for serialising and deserialising commands and data. In this case, all that would be required would be for the constructs of that proprietary language to be specified to the command input interface 24 and the command delivery interface 26.

Typically, in order to enable usage of the command input interface 24, it will be necessary to install DLL libraries 50 on the client terminal device 12. These libraries 50 contain a set of conversions for many popular commands which can be executed. In the present embodiment, over 400 different commands are provided but in other embodiments the number of commands could be higher or lower. These DLL libraries 50 may also be installed in the client terminal device 12 on which the browser environment 42 resides, but for ease of readability of the figures, these are not shown in FIG. 2.

It is to be appreciated that the SOAP and REST API interfaces 134, 136 are interchangeable. Some RPA solutions might choose to use the REST API 136 instead of the SOAP API 134 if that particular RPA solution can only perform, or is better suited to, performing REST API calls. Equally, a browser-based application 44 might choose to use the SOAP API. Both the REST and SOAP APIs have the same level of functionality and are simply two different parallel interfaces implemented to provide the highest levels of compatibility with different systems.

The encrypted requests are then received by the command delivery interface 26. These are received in accordance with embodiments described above (e.g. through an external communications network 28). The command delivery interface 26 will typically run within a user session, i.e. a remote desktop server session 22 associated with a particular user with appropriately configured user access rights. The user session enables interaction with applications 60 running on a virtual machine which has been set up in response to commands received from the command input interface 24. Equivalently, interaction is also enabled directly with the operating system/file system 62 which resides on the remote desktop server 16 on which the remote desktop server session 22 resides. In fact, a plurality of virtual machines may be running concurrently in a target environment and within at least one of these virtual machines acting as a remote desktop server 16, the user session is active.

Figure 6:
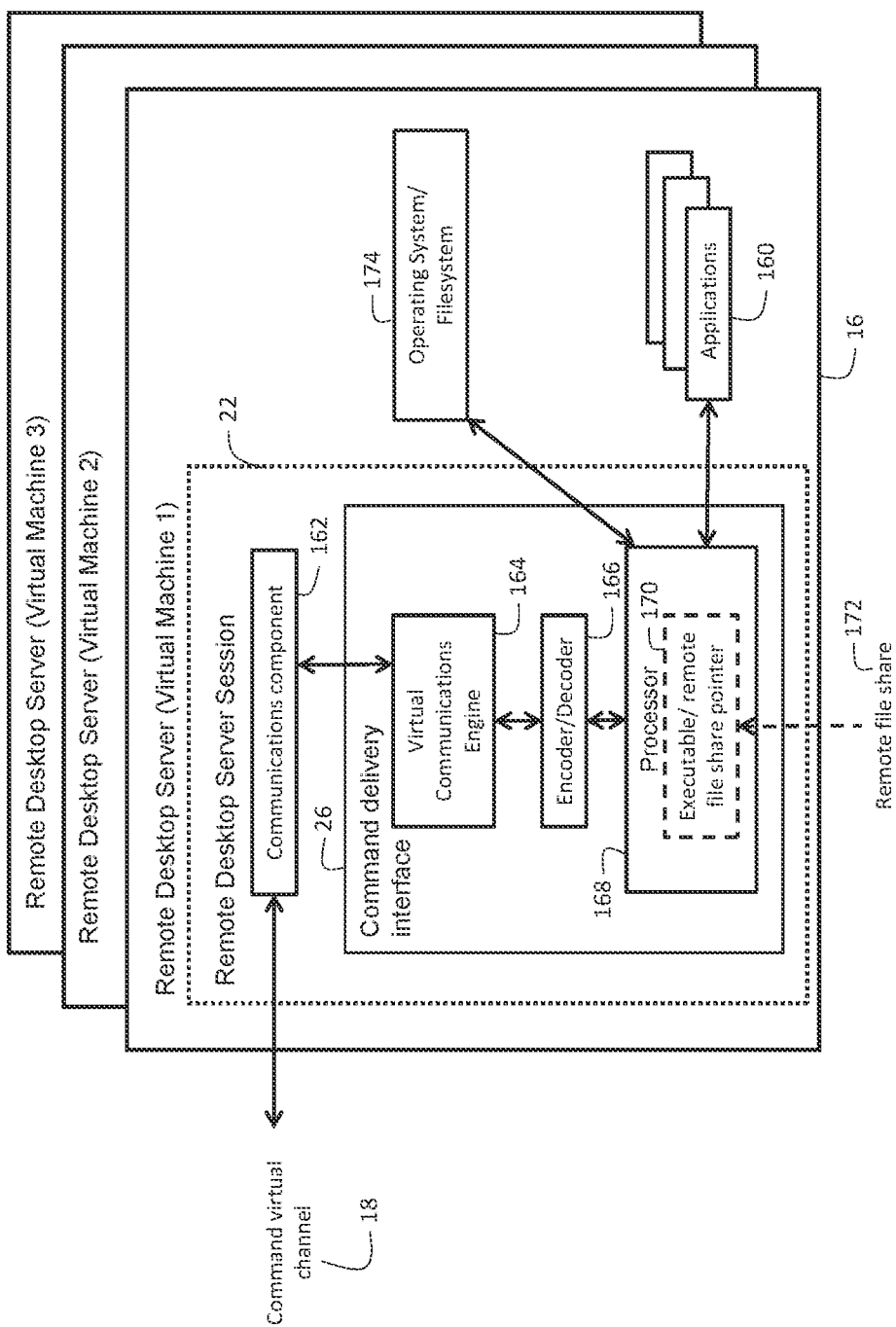
FIG. 6 is a schematic block diagram of a command delivery interface component operating within a remote desktop server shown in FIGS. 1A and 1B.

In some embodiments, the command delivery interface 26 may be launched from a remote file share as is shown in FIG. 6 (described later). This will typically be achieved by launching of an application which is made available to a plurality of remote desktop servers 16 through a shared network executable file. The significant advantage of this is that no direct installation and no administration privileges are required to implement this which negates most of the implementation and the security risks associated with installation of a third-party application on a server/computer. Also, a file share deployment solution is instantly scalable where it can be executed by hundreds of computers either singularly or in parallel. Furthermore, updates to the command delivery interface 26 need only be carried out at a single location on the file share rather than requiring painstaking updates to be run on the hundreds of computers.

Once the command delivery interface 26 receives the requests, the command delivery interface 26 then decrypts the received request and performs the requested action which may involve performing an API call, running a program, inputting data into an application or web browser, moving the mouse or any other mechanism required to fulfil the request.

It is to be appreciated that depending on the specific command or type of command received by the command delivery interface, different actions may be performed. For example, the primary function of the command delivery interface 26 in the present embodiment is to perform the following actions on a received message containing the command:

Deserialised the message so it can be understood by the Command Delivery Interface 26.

Check the command structure for errors/invalid input.

Convert (reformat) the command into whatever format is required for the desired target API (that being either an Operating System API or an application's API—both of these APIs being referred to as a 'remote application' as defined above). For example, if JSON is used as a messaging protocol then this needs to be reformatted into the format acceptable to the remote application (destination API)

Sent to the correct recipient (the correct 'remote application').

Of course, the reverse process to that stated above occurs when the command delivery interface 26 receives a response to the command from the remote application (OS API or application API).

It is also to be appreciated that the above conversion of the command into the correct format for the recipient API can also involve creating sub commands from the received command. Accordingly, the command delivery interface can not only deal with commands that are a 1 to 1 translation, for example: 'Copy file from A to B', which is received as a single command (over the virtual channel) and results in a single OS API call, but also it can handle commands which require a 1 to N conversion. An example of this is 'Read a cell from a table'. This is received as a single command (over the virtual channel) which might say read cell X,Y in table T and give me the text value. This command would then result in many API sub commands listed below as an example:

OS API to find the window which contains the table

Application API to find the table

Application APIs to locate the relevant cell in the table

Application APIs to determine what is in the cell (e.g. a label or text or a button or a checkbox)

Application APIs to read the relevant detail of the element in the cell (e.g. a label you'd read the text, for a button you'd read the label inside the button).

Another way of considering this is that he received command is a "high level" command since it describes the action required in terms that a user would understand, but it results in a plurality of "low level" API calls (or sub commands) being issued behind-the-scenes (by the command delivery interface 26).

The received command is either sent to the application within the remote session or to the Operating system responsible for that remote session, depending on the action/most suitable recipient of that command. These types of decisions are made by the command delivery interface. Examples of different remote applications to where the commands can be sent are provided below:

Word, Excel, Outlook (i.e. MS Office)

Commands are directly sent to the Office (Visual Basic Object) VBO system and hence directly actioned by the target application.

HLLAPI

Commands are directly sent to the Mainframe emulator application via its HLLAPI interface and hence directly actioned by the target application.

SAP

Commands are directly sent to the SAP GUI scripting API and hence directly actioned by the target application.

Win32/UIA

Commands are sent to a set of Operating Systems (OS) APIs. In those API calls, elements that are visible on-screen (e.g. Windows, menus, tables, buttons, checkboxes) are referenced by unique identifier and the command asks the OS to interact with them. The OS works out which instance of an application is responsible for that element (e.g. a Windows app running inside the remote desktop session) and then sends a message to the underlying GUI layer which is responsible for managing the display for that application. This an indirect way of communicating with the target application because the application is unaware of how it happened—the application just knows, for example, that a button was pressed.

Browser

Commands are sent to the web browser via the JavaScript engine of that browser, and so this is a direct communication with the target application.

Java

Commands are sent to the Java Access Bridge API which provides an interface to interact with the application GUI elements. So, this can be considered to be a communication to the target application via a "proxy" which both the command Delivery Interface and the Java application are talking and listening to.

File actions

Commands are sent directly to the Operating System (OS).

In some embodiments, the results of the action are provided back to the command input interface 24 from which the request originates. This will typically be achieved through transmission back through the external communications network 28 (or alternatively implemented communications channel). In such embodiments, the results may be that the command included in the request was successfully executed, or may indicate failure of execution of the command. In the case of failure, an error code may be provided by the application to indicate the reason why the command failed to execute. In the case of some successful commands, there may be a result of that command which has to be returned to the command input interface 24. This is often termed the 'output' of the command and could for example be a value which is present at a particular data structure location. All of these responses from the execution of the command are then used to construct the JSON Response (or alternative suitably configured response structure) which is then encrypted and transmitted back to the command input interface 24 which generated the original request. This process will be described in further detail with reference to FIG. 7.

In these embodiments, the results when received at the command input interface 24 are decrypted and then reinterpreted back into the language of the originating command, namely the RPA application 14 or the browser-based application 44. The received results may be used in order to generate further commands by either the RPA application 14 or the browser-based application 44. This process will be described in further detail with reference to FIG. 7.

Referring now to FIGS. 3A and 3B, an example structure of JSON Requests 80 and JSON Responses 90 is described in greater detail. As shown in FIG. 3A, the JSON Request has three fields namely:
1) A Command field 82, which provides the name of a particular command being transmitted;
2) An Arguments Field 84, which provides the payload for the commands (a deeper JSON structure); and
3) A Unique ID field 86, which provides a unique identifier for that specific command from the specific command input interface 24 which transmitted that command.

As shown in FIG. 3B, the JSON Response has five fields, namely:
1) A Command field 92, which provides the name of the command being responded to;
2) A Unique ID field 94, which provides a unique identifier for that specific command from the specific command input interface 24 which is being responded to;
3) A Command Success 96 field, indicating whether the command was able to be executed successfully or not;
4) An Error Message field 98, which provides an error message if a command failed indicating why this happened; and
5) An Output field 100, which provides an output from execution of the command.

It is to be appreciated that the above request 80 and response 90 structures are provided by way of illustration only. The structure itself may be suitably adapted by the skilled addressee to include additional fields which may provide enhanced or more efficient functionality of these requests. Similarly, in cases where particular fields are not required (e.g. if the result of a particular command provides no specific output 100), then it is possible to adapt the structures to remove these particular fields in the request 80 and or response 90. It is also to be appreciated that whilst the structure shown are specified as JSON Requests 80 and JSON Reponses 90, it is also possible that other suitably configured request structure formats may be used which achieve the desired functionality.

Figure 4:
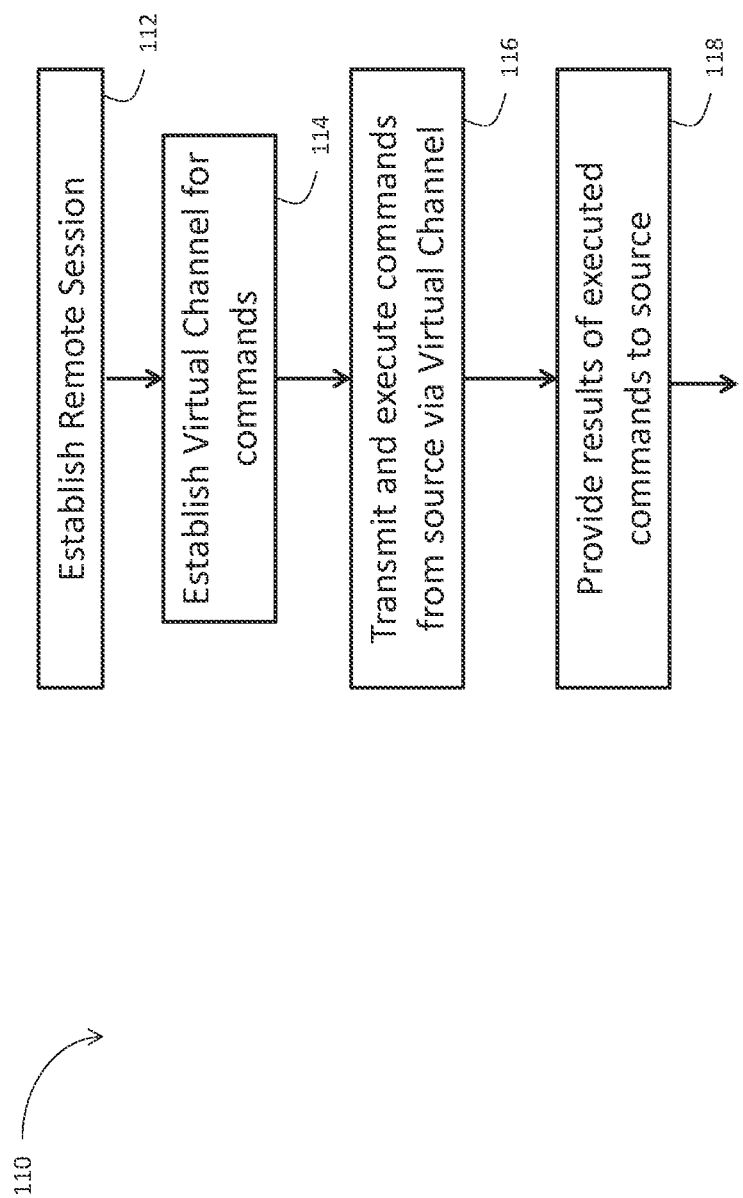
FIG. 4 is a flow chart showing the general operation of the system shown in FIGS. 1A and 1B.

Turning to FIG. 4, there is shown a high-level flow diagram of the process 110 followed by the systems of FIGS. 1A and 1B. The process 110 commences with the establishing, at Step 112, of a remote desktop session between the remote desktop server 16 and the client terminal device 12. Much of this step follows a conventional approach and so is not described in greater detail herein. As part of Step 112, the method 110 establishes, at Step 114, a virtual channel 18 for transmitting commands between the remote desktop server 16 and the client terminal device 12 in accordance with embodiments described above. Whilst conventional virtual channels 18 which are set up will enable data relating to cursor movement and keystrokes to be transmitted, these are unable to transmit commands which directly interface with applications/web browsers etc, as noted above. The virtual channel 18 established at Step 114 additionally enables the transmission of such executable commands which are to be transmitted from the client terminal device 12 to the remote desktop server 16 and executed at the remote desktop server 16. This virtual channel 18 may be separate to other virtual channels which are established (i.e. for provision of data relating to keystrokes and cursor movement) and may be provided with a unique identifier.

The method 110 then proceeds to transmit and execute, at Step 116 commands generated by the RPA application 14 to the remote desktop server 16. This is in accordance with embodiments described herein. In embodiments in which the automated command system 10, 40 is configured to also return the results of an executed command to the client terminal device 12, to provide, at Step 118, the result of the execution of the command to the originating client terminal device 12. These commands are also provided via the established command virtual channel 18. As noted above, the result of the execution may simply be a confirmation that the command had been executed or failed, but in some cases the commands generate a payload or 'output' as has been mentioned previously. This output may also be included in the response which is sent back to the local terminal.

The method 110 describes has been given with relation to an embodiment with reference to FIG. 1A i.e. using an RPA application 14 installed on a local client terminal 12. It is to be appreciated that the method 110 may be similarly followed using the embodiment of FIG. 1B using an appropriate configuration. In particular, in such an embodiment, the commands are first issued from a browser-based application 44 installed on a browser environment 42, and then results of the commands are issued back to the originating browser environment 42.

Further details regarding the method followed by the automated command system 10, 40 are given later with reference to FIG. 7.

Figure 5:
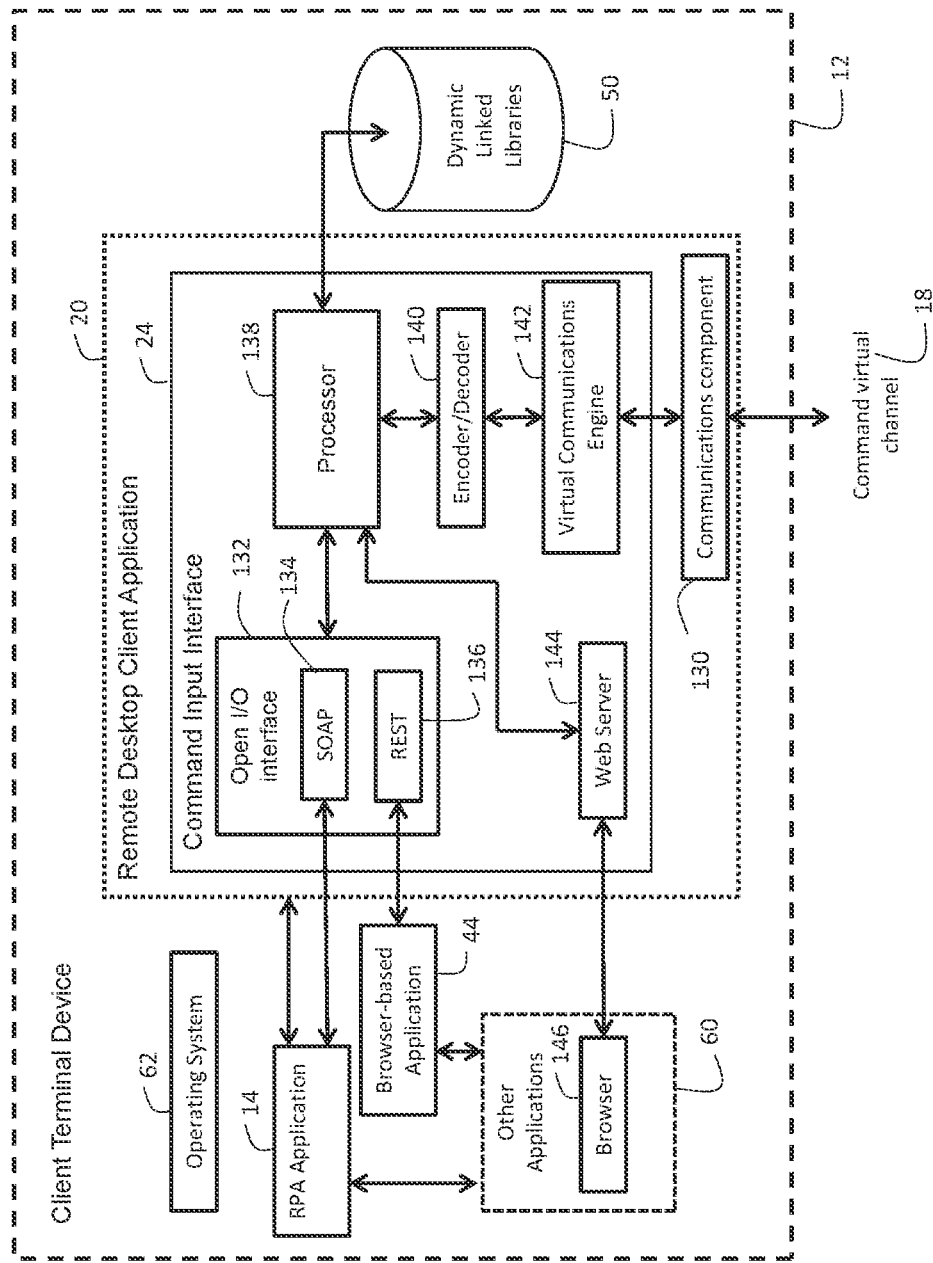
FIG. 5 is a schematic block diagram of a command input interface component operating within a client terminal device shown in FIGS. 1A and 1B.

Referring now to FIG. 5, there is shown a client terminal device 12 of FIG. 1A and a browser environment 42 of FIG. 1B in greater detail. It is to be appreciated that the two embodiments may be used either as alternatives to one another or may be used in combination in accordance with the requirements of one or more users. As can be seen, client terminal device 12 has a plurality of applications 60 running on it including an RPA application 14 or a browser-based application 44 which in turn may interact with other applications running on the client terminal device 12.

A remote desktop client application 20 is provided on the client terminal device 12 which effectively acts as an RPA virtual worker. The remote desktop client application 20 has a communications component 130 which acts to establish a standard communications channel (link) 15 with the remote desktop server 16. The communications component 130, acts in a standard way establishing dedicated virtual channels 18 within the communications link 15 for each different type of user interaction that is to be monitored, for example a 'cursor movement' virtual channel 18 or a 'keystroke capture' virtual channel 18. In the present embodiment, the communications channel 15 also may act so as to establish an 'executable command'-based virtual channel 18 which will be discussed later. It is to be noted that in typical known systems, the communications component may be communicably coupled directly to the RPA application 14 or browser-based application 44 in order for standard Surface Automation commands to be transmitted.

The remote desktop client application 20 also includes the command input interface 24 which has been set up by the remote desktop client application 20 to use the virtual channel 18 established by the communications component tors is to provide an open API to accommodate communications with different RPA 14 and browser-based applications 44 running on the client terminal device 12. Each application can convert its commands into a format which matches the open standard of either the SOAP interface or the REST interface. As these are well-known open standards they are not described in any further detail.

These interpreted commands are then sent to a processor 138 to which the open I/O interface 132 is communicably coupled which effectively translates the received open-interface commands into an explicit instruction in the language of the application on which the command is to be executed. As has been defined earlier in this specification, such an application (remote application) can also include the operating system of the remote computer on which the command delivery interface 26 is being run. This is achieved by accessing a database of Dynamic Linked Library (DLL) 50 of application-specific commands which are provided at the client terminal device 12. This DLL database 50 contains a set of conversions for many popular commands which can be executed. In the present embodiment, over 400 different commands are provided but in other embodiments the number of commands could be higher or lower. An example of some of these commands which are available to be used in the command virtual channel 18 and which are supported by the command input interface 24 and command delivery interface 26 is provided in Table 1 below:

TABLE 1

| | |
|---|---|
| MSExcelCreateInstance | Loads Microsoft Excel |
| MSExcelOpenWorkbook | Opens a workbook in Microsoft Excel |
| MSExcelCreateWorkbook | Create a new Microsoft Excel workbook |
| MSExcelGetCellValue | Reads a cell value in an open Microsoft Excel workbook |
| MSExcelGetNumberOfRows | Returns the number of rows in a Microsoft Excel workbook |
| RunProcess | Runs a specified program |
| SetDefaultPrinter | Sets the default printer to a specified printer |
| MoveMouseToCoordinate | Moves the mouse to a specified coordinate |
| FileExists | Reports whether a specified file exists |
| CopyFile | Copies a file to a new location or name |
| GetFiles | Returns a list of files in a specified folder |
| SetOwnerOnFile | Changes the owner of a file |
| BrowserOpenChrome | Opens the Google Chrome browser |
| BrowserNavigateToURL | Navigates an opened web browser to a specified URL |
| BrowserInputTextIntoElement | Inputs a specified string of text into a specified web control on an open webpage |
| BrowserClickElement | Clicks a specified button on an open web page |
| BrowserGetTableContents | Retries the contents of a specified table on an open web page |
| UIAWaitForDesktopElement | Waits for a specified window to appear on the desktop |
| UIAPressElement | Presses button in a specified application on the desktop |
| UIAInputTextIntoElement | Inputs text into a field or text area in a specified application on the desktop |
| UIACheckElement | Checks (ticks) a specified element in a specified application on the desktop |
| UIAGetDesktopElements | Returns a list of all open windows on the desktop |

130. However, the command input interface 24 establishes a new type of virtual channel 18 within the communications channel 15 which is used for commands.

The command input interface 24 is configured to interpret commands received from the RPA application 14 or the browser-based application 44. In this regard, the command input interface 24 comprises an open I/O interface 132, which in this case has a SOAP API interface connector 134 and a REST API interface connector 136, running. The purpose of the SOAP 134 and REST 136 interface connec- Of the commands above, there are several key commands. In particular, there are commands that work on the file system: for example, launching and closing applications and also commands that determine whether an application is running or not. These are very useful commands because they can be required to determine or create the correct environment in which the command can be executed. For example, if a version of Microsoft Excel is not being run on the remote desktop server 16, then sending a command to read a cell in a spreadsheet would simply not work.

In addition to the built-in commands, in some embodiments of the present invention, a facility is provided to allow a developer to write their own code for a new command and to insert that into the functionality of the command input interface 24 and command delivery interface 26. In this way, the developer can create new APIs more easily.

The processor 138 is communicably coupled to an encoder/decoder 140. Once the processor 138 has converted the received open-interface command into an explicit instruction using the appropriate command from the DLL database 50, the command is sent to the encoder/decoder 140 to be encoded into an appropriate communications format. In the present embodiment this is a JSON format which is described above with reference to FIG. 3A, but this may comprise any appropriately configured command request format. Each command may be assigned a unique identifier 86 as this may be referenced to coordinate the appropriate response back to the originating RPA application 14.

The encoder/decoder 140 is additionally coupled to a virtual communications engine 142. The virtual communications engine 142 is configured to receive an encoded command from the encoder/decoder 140. The virtual communications engine 142 is additionally communicably coupled to the communications component 130 (in accordance with embodiments described above). The communications component 130 is located on the client terminal device 12 but located outside of the command input interface 24. The communications component 130 receives the encoded command passed to it from the virtual communications engine 142. It is to be appreciated that the function of the virtual communications engine 142 is to establish the new command virtual channel 18 within the architecture provided for the remote desktop session. This command virtual channel 18 is considered to be just another channel for communications of a stream of specific user interface interaction by the remote desktop client application 20. However, the command virtual channel 18 actually is used to transmit commands which are typically not in a stream and which each require a response before the next command is sent. The output of the virtual communications engine 142 is passed to the communications component 130 of the remote desktop client application 20 and so it is treated as a normal channel of the remote desktop client application 20. The encoded command is then transmitted in JSON format (or suitably configured alternative command format) to the command delivery interface 26 at the remote desktop server 16.

The command input interface 24 also comprises a web server 144 which is linked to the DLL database 50 that runs on the processor. The web server 144 provides a window into the operation of the DLL database 50 on the processor 138 and allows a developer, for example, to see what functionality is available on the DLL via a simple Internet web browser 146 provided locally on the client terminal device 12 so that this information can be used in the RPA application 14. The web server 144 is intended to only be used by the developer using that particular client terminal device 12 and hence will only accept connections from a web browser 146 on that local machine. The web server 144 also provides an interface to allow the developer to "inspect" some of the internal details of applications or webpages running on the remote desktop server. This internal information may be used to create the correct instructions to form the overall automation.

In addition, the embodiment of FIG. 5 is additionally be configured to receive results of executed commands in accordance with embodiments described above. In such embodiments, a response is transmitted using the command virtual channel 18 from the command delivery interface 26. This transmitted result is received by the communications component 130 and subsequently transmitted to the virtual communications engine 142 which was used to establish the command virtual channel 18. This is then subsequently transmitted to the encoder/decoder 140 which performs the corresponding opposite encoding or decoding action which was used to initially prepare the command request. This encoded/decoded request is then passed to the processor 138, followed by the open I/O interface 134 (using the appropriate SOAP/REST/alternative protocol method), before ultimately being passed back to the RPA application 14 or browser-based application 44 which initially submitted the command. More details regarding the generation of the results/response is given with reference to FIG. 6.

Turning to FIG. 6, the remote desktop server 16 is shown in greater detail. As can be seen, the remote desktop server 16 is implemented on a virtual machine and there are a plurality of different applications 160 running on that virtual machine. It is also to be appreciated that a plurality of these virtual machines, each running an implementation of one or more of the applications 160 and a remote desktop server session 22. In some embodiments, each virtual machine may be provided with only some of a range of applications, leading to arrangements where some virtual machines may only be configured to enable particular applications to be run on a particular remote desktop server 16.

A remote desktop server session 22 is provided on the remote desktop server 16 that has a communications component 162 which would typically establish a standard remote desktop virtual channel with a remote desktop client application 20 running on a client terminal device 12. The communications component 162, acts in a standard way in establishing dedicated channels for each different type of interaction that is to be monitored, for example a cursor movement virtual channel or a keystroke capture virtual channel. In the present embodiment, the communications component 162 is also configured to receive JSON requests sent from the command input interface 24 over the command virtual channel 18 as described with reference to FIG. 5.

The remote desktop server session 22 also includes the command delivery interface 26 which has been set up by the remote desktop server 16 to use the virtual channels standardly established by the communications component 162. However, the command delivery interface 26 of the present embodiment is connected specifically to the command virtual channel 18 which is used for commands via the communications component 162. Accordingly, the command delivery interface 26, similarly to the command input interface 24 has a virtual communications engine 164 which receives transmitted JSON commands which are passed from the communications component 162. Once received, the requests are passed to an encoder/decoder 166 which translates JSON format commands received into a language suitable to be executed on the relevant applications 160 on the remote desktop server 16.

Following the encoding/decoding operation performed by the encoder/decoder 166, the command request is then passed to a processor 168 provided in the command delivery interface 26. The processor 168 acts so as to enact the received command on an executable file 170. Whilst it is possible for the executable file 170 to be within the processor 168, it is advantageous if a single copy of the executable file 170 is placed in a remote file share location 172 and the executable 170 is simply run and the effects of that executable are realised at the processor 168. The effects will typically comprise an action being directly executed on a particular application 160 or the operating system/filesystem (e.g. to open a particular file).

As noted above, not only does the command delivery interface 26 route executable commands to the appropriate application but it also receives responses from the application to the commands and creates response messages 90 which are also sent back to the command input interface 24 to present back as a response to the command 80. In this regard, the responses 90 are encoded by the encoder into the JSON format, an example of which is specified in FIG. 3B. As noted previously, the responses 90 may include indications 96 that an executed command has been successful or unsuccessful. In some embodiments, the provided commands when executed may generate an output value 100 to be returned to the original RPA 14 or browser-based 44 application which generated the initial command. Both of these may be encoded within the example JSON format shown in FIG. 3B which is achieved by use of the encoder/decoder 166. The encoded response 90 is then passed to the virtual communications engine 164 used to establish the command virtual channel 18. This is then passed to the communications component 162 so that the encoded response 90 may be sent back to the original requesting client terminal device 12 using the command virtual channel 18.

Figure 7:
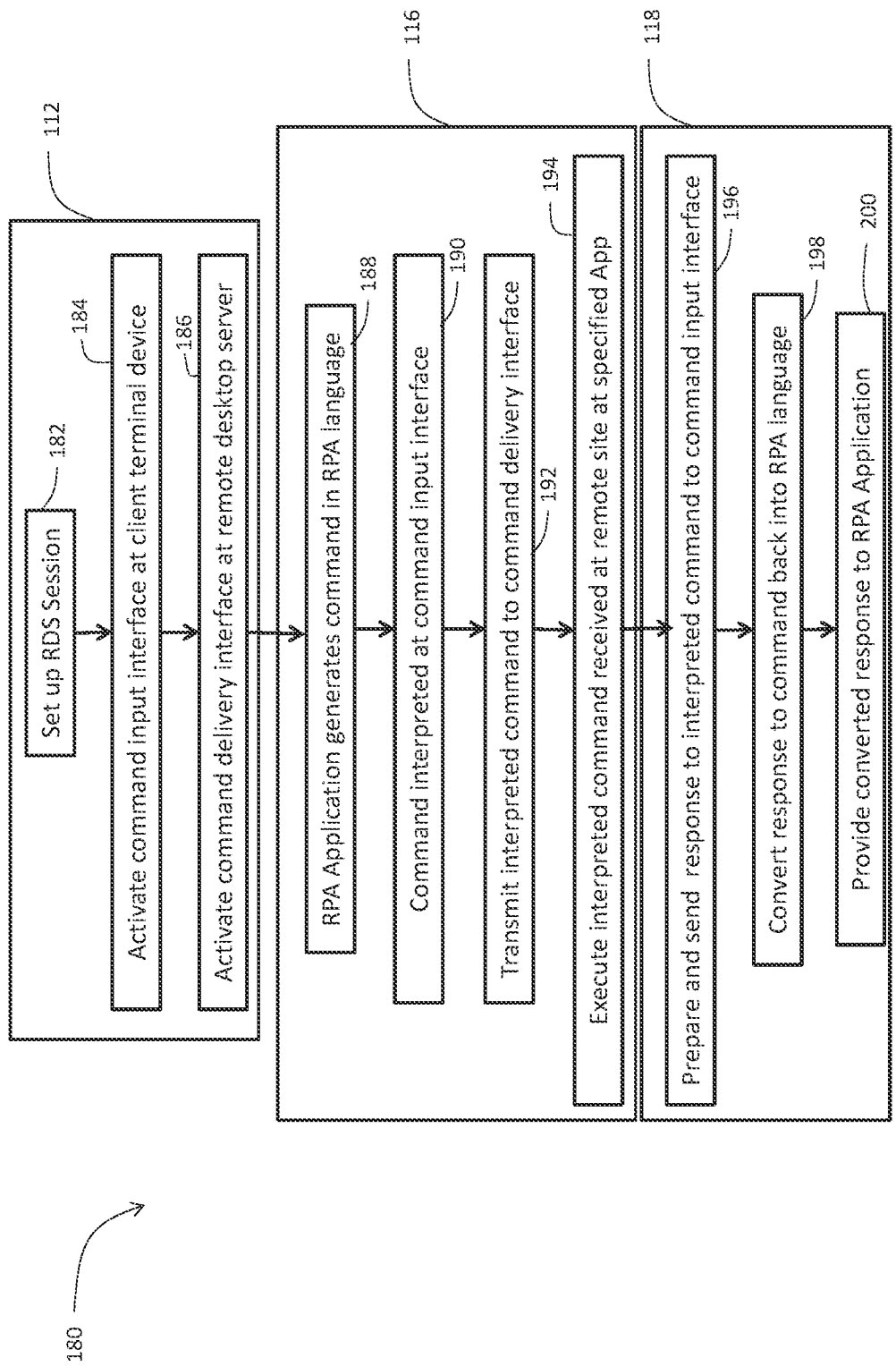
FIG. 7 is a flow chart showing the operation of the system shown in FIG. 4 in greater detail.

Referring now to FIG. 7, there is shown a method of operation 180 of the automated command system 10, 40 of FIGS. 1A and 1B. In particular, this shows the process 110 of FIG. 4 in more detail.

The method of operation 180 commences by establishing, at Step 112, a remote desktop server session. More particularly the process 110 comprises firstly setting up, at Step 182 a remote desktop session in accordance with known embodiments and embodiments described above. Such a session includes setting up a virtual channel 18 for commands as has been described above. The method 180 then proceeds to activate, at Step 184, a command input interface 24 component at the client terminal device 12. Simultaneously, the method proceeds, at Step 186, to activate a command delivery interface 26 component at the remote desktop server 16. In order to determine which remote desktop server 16 the remote desktop server session 22 is opened on, the RPA application 14 or browser-based application 44 is configured to provide the relevant information as part of the command generation process. Similarly, the command generation process also may be configured to identify which application, web browser, operating system or file system functionality is to be accessed by the command. As part of the activation of the command input interface 24 and the command delivery interface 26, a command virtual channel 18 is also established at Step 114 (see FIG. 4). The command input interface 24 and the command delivery interface 26 are additionally configured to support the functionality around using of the command virtual channel 18 for sending and receiving commands.

It is to be appreciated that the command delivery interface 26 runs on an appropriately assigned remote desktop server 16 which itself is a virtual machine. The command delivery interface 26 is primarily responsible for routing interpreted commands to the relevant application or browser on the single remote desktop virtual machine 16 that the command delivery interface 26 is running on.

As has been shown in FIG. 6, there is typically more than one remote desktop server virtual machine 16 (with a respective command delivery interface 26 being capable of running on each one, individually or in parallel). The choice regarding which remote desktop server virtual machine 16 to connect to is taken at the very start, namely at the point at which the RPA application 14 or browser-based application 44 establishes the connection to a remote desktop server 16. This in turn then causes the command input interface 24 (on the client terminal device 12) and the command delivery interface 26 (on the remote desktop server 16) to begin execution.

There are various different ways in which the choice of remote desktop server virtual machine 16 to connect to can be made. Typically, this depends on how the remote desktop server solution has been setup by the user. Common possibilities include:

a. The RPA application 14 or browser-based application 44 can manually choose which remote desktop server virtual machine 16 to connect to (as their names and/or addresses may be known).

b. The remote desktop solution automatically routes to the "least busy" remote desktop server virtual machine 16 where "least busy" is a metric determined by an algorithm in the remote (target) environment of the plurality of remote desktop server virtual machines 16.

Both of these possibilities are components of a remote desktop solution and are simply leveraged by the automated command system 10, 40.

Regarding parallel or single connections, there are various scenarios which are possible and a covered by the present embodiments. These include:

a. A single client terminal device 12 (where the command input interface 24 resides) connects to a plurality of remote desktop servers 16 one at a time. Each remote desktop server 16 would have its own command delivery interface 26. An example workflow might look like: Connect to remote desktop server A. Perform tasks on remote desktop server A. Logoff remote desktop server A. Connect to remote desktop server B. Perform tasks on remote desktop server B. Logoff remote desktop server B. Repeat. There would be a single instance of the command input interface 24 running at any one time (since there is only a single remote desktop connection at any one time) and that command input interface 24 would be sending and receiving messages to the appropriate command delivery interface 26 on whichever remote desktop server 16 it was currently connected to.

b. A single client terminal device 12 connects to various remote desktop servers 16 in parallel, where the RPA application 14 would be deciding which remote desktop server to send the command to (i.e. the routing decision is made at the "edge"). In this scenario there would be multiple instances of the command input interface 24 running on the client terminal device 12, each command input interface 24 talking to a different command delivery interface 26 provided on a different remote desktop server 16. The workflow might look like: Connect to remote desktop server A. Connect to remote desktop server B. Connect to remote desktop server C. Perform tasks across remote desktop servers A, B, C depending on the overall requirement. Logoff remote desktop server A. Logoff remote desktop server B. Logoff remote desktop server C.

c. Multiple client terminal devices 12 each under control of a central RPA orchestrator (part of an RPA command flow) and each performing a mix of options a) or b) above.

Option c) combined with a) is a most commonly used combination in the present embodiments.

The above examples highlight that the routing to different remote desktop virtual machines 16 takes place at the local system where the command input interface 24 resides. Once a connection is formed to a remote desktop server 26 then a command input interface 24/command delivery interface 26 pair is established which communicate down the command virtual channel 18 between them.

Returning now to the method 180 of FIG. 7, the next step 116 of transmitting and executing commands from the source client terminal device 12 via the command virtual channel 18 comprises four steps. Firstly, the RPA application 14 generates, at Step 188, a command in the language of the RPA application 14, typically a SOAP call (or in the case of a browser-based application 44, generates a REST call). This is the command which is to be sent to the remote desktop server 16 upon which the command delivery interface 26 resides. The RPA command structure is used to define which application 160 on which remote desktop server session 22 running on the remote desktop server 16 that the command is to be executed on. This is important as more than one instance of a particular application may be running on a virtual machine 16 and also there may be multiple virtual machines running concurrently on the target environment.

Following this, the command is then interpreted, at Step 190, by the command input interface 24 into one of a set of individual commands available for execution in a specific application 160. The conversion also includes preparation for sending over the command virtual channel 18 and this entails encoding and encryption of the command in a manner known to the automated command system 10, 40. This encoding and encryption is performed in accordance with embodiments described above.

The encoded command is then transmitted, at Step 192, to the command delivery interface 26 via the command virtual channel 18. Once the command is received it is decoded and decrypted by the command delivery interface 26 in accordance with embodiments described above, and is forwarded to the specified application 160, web browser, file system or operating system on the specified remote desktop server 16. The command is then executed, at Step 194, using the relevant application 160, web browser, file system or operating system.

As mentioned above, the outcome of the executed command can be simply a confirmation that it was executed successfully, or a confirmation that it could not be executed. If the command was executed successfully in some cases this generates an output (again as mentioned above). In some embodiments, the command delivery interface 26 will be configured to deliver the confirmation and/or output back to the RPA application 14 or browser-based application 44 which submitted the original command request.

In such embodiments where responses are generated, the output and/or confirmation is returned to the command delivery interface 26 as a consequence of successful execution. Similarly, if the command could not be executed, this may lead to the generation of an error code 98. This error code 98 is also returned to the command delivery interface 26.

The Command delivery interface 26 gathers the results of the execution of the command and then prepares, at Step 196, a response to the specific command to send to the command input interface 24 via the command virtual channel 18. The response is then encoded and encrypted and sent via the command virtual channel 18 to the command input interface 24 where is it is decrypted and decoded at Step 198 back into the language of the RPA application 14 or the browser-based application 44 from which the original command originated.

The decrypted and decoded command is then passed, at Step 200, to the RPA application 14 or browser-based application 44 for processing. It is to be appreciated that the above-described process is agnostic to the specific RPA application 14 or browser-based application 44 being used and any command regardless of the specific application generating it, can be handled by the system and method described above.

Furthermore, it will be understood that features, advantages and functionality of the different embodiments described herein may be combined where context allows.

Having described several exemplary embodiments of the present invention and the implementation of different functions of the device in detail, it is to be appreciated that the skilled addressee will readily be able to adapt the basic configuration of the system to carry out described functionality without requiring detailed explanation of how this would be achieved. Therefore, in the present specification several functions of the system have been described in different places without an explanation of the required detailed implementation as this not necessary given the abilities of the skilled addressee to code functionality into the system.

It is also to be appreciated that the present embodiments will be well understood by the skilled addressee and that they may be adapted to cover equivalent functions and elements without departure from the present invention as determined by the claims. For example, whilst the present embodiments have been described with reference to a remote desktop server, in other embodiments the second computer system may not actually be a server computer as such, it could be a non-server computer. The present term 'second computer system' as used herein is intended to cover server-based computers and non-server-based computers.

What is claimed is:

1. A computer implemented method of communicating with a remote application, the method comprising:
    establishing a remote desktop session between a first computing system and a second remotely located computing system having access to the remote application; the establishing step including setting up a virtual channel for communication of data relating to graphical user interface interactions at the first computing system to the second remotely located computing system;
    preparing a command for execution by the remote application, the command including a command identifier and being configured to require a response;
    transmitting the command for the remote application from the first computing system to the second remotely located computing system via the virtual channel;
    receiving the command at the second remotely located computing system and providing the command to the remote application seeking to execute the command;
    generating an execution response to the provision of the command to the remote application, the response including the command identifier; and
    sending the response to the first computing system via the virtual channel.

2. The method of claim 1, wherein the establishing step comprises activating a command input interface at the first computer system and activating a command delivery interface at the second remotely located computing system, the command input interface and the command delivery interface communicating via the virtual channel.

3. The method of claim 2, wherein the establishing step comprises providing to the command delivery interface a link to an executable program for controlling an operation of the command delivery interface, the link being directed to a file share location on a file share data store.

4. The method of claim 3, wherein the receiving, generating and sending steps are controlled by the executable program provided at the file share location of the file share store.

5. The method of claim 1, wherein the preparing step comprises receiving the command in a first language of an application running on the first computer system and translating the command into a second language of the remote application.

6. The method of claim 5, wherein the translating step comprises using an open input/output interface to translate a first format of the command operable under a first operating system of the first computer system into a second format of the command that is executable under a second operating system of the second remotely located computing system.

7. The method of claim 6, wherein the translating step comprises the open input/output interface operating a Simple Object Access Protocol (SOAP) messaging protocol and/or a Representation State Transfer (REST) messaging protocol.

8. The method of claim 5, wherein the translating step comprises using a set of predetermined types of commands stored in a local data store.

9. The method of claim 1, wherein the preparing step comprises including arguments or parameters in the command which determine an operation of the command at the remote application.

10. The method of claim 1, wherein the preparing step comprises generating the command in a JavaScript Object Notation (JSON) format.

11. The method of claim 1, wherein the receiving step comprises comparing a type of the command against a list of acceptable types of commands and filtering out the command if it does not conform to a predetermined acceptable type of command.

12. The method of claim 11, wherein the type of the command comprises a new form command having an instruction which has not previously been known to the second remotely located computing system and the comparing step comprises determining if the new form command is permitted by the second remotely located computing system.

13. The method of claim 1, further comprising converting the received command into a plurality of sub-commands representing the received command and the providing step comprises providing the sub-commands to the remote application.

14. The method of claim 1, further comprising converting a first format of received command at the second remotely located computing system into a second format of the remote application before providing the remote command to the remote application.

15. The method of claim 1, wherein the generating step comprises generating the response to include a command success field indicating whether the command was successful or not.

16. The method of claim 1, wherein the command comprises executable code comprising a plurality of commands, and the generating step comprises generating a response indicating whether an execution of code by the remote application was successful.

17. The method of claim 16, wherein the command further comprises executable code for updating the remote application, and the response generated indicates whether the updating of the remote application was successful.

18. The method of claim 1, wherein the generating step comprises generating the response to include an output field providing an output generated by the remote application following execution of the command.

19. The method of claim 1, further comprising providing a switching function at the first computing system, the switching function determining, in use, if the command needs to be executed locally or remotely, and if the command needs to be executed locally, then forwarding the command to a local application provided at the first computing system.

20. The method of claim 1, further comprising receiving an instruction to generate the command from an RPA application, a browser application, a UAT application or an automated script.

21. The method of claim 1, further comprising using a webserver provided at the first computing system to configure an operation of the remote desktop session between the first and the second computing systems.

22. A system for implementing an automated process orchestration with a remote application, the system comprising:
a remote desktop client application at a first computing system and a remote desktop server session at a second computing system remotely located from the first computing system, the second computing system having access to the remote application, wherein the remote desktop client application and the remote desktop server session are configured to establish a remote desktop session between the first and second computing systems, the remote desktop session including a virtual channel for communication of data relating to graphical user interface interactions at the first computing system to the second computing system;
the remote desktop client application being configured to prepare a command for execution by the remote application, the command including a command identifier and being configured to require a response;
the remote desktop client application including a communications engine configured to transmit the command for the remote application to the second computing system via the virtual channel;
the remote desktop server session including a receiver configured to receive the command;
the remote desktop server session being configured to provide the command to the remote application seeking to execute the command; and to generate an execution response to a provision of the command to the remote application, the response including the command identifier; and
the remote desktop server session further comprising a response engine configured to send the response to the first computing system via the virtual channel.

23. The system of claim 22, wherein the remote desktop client application comprises a command input interface and the remote desktop server session comprises a command delivery interface, the command input interface and the command delivery interface configured to communicate via the virtual channel.

24. The system of claim 23, wherein the command input interface comprises an open input/output interface configured to translate a first format of the command operable under a first operating system of the first computer system into a second format of the command that is executable under a second operating system of the second computing system.

25. The system of claim 24, wherein the open input/output interface operates a Simple Object Access Protocol (SOAP) messaging protocol and/or a Representation State Transfer (REST) messaging protocol.

26. The system of claim 23, wherein the command delivery interface is configured to convert the received command into a plurality of sub-commands representing the received command and to provide at least some of the sub-commands to the remote application.

27. The system of claim 23, wherein the command delivery interface is configured to convert a first format of received command into a second format of the remote application before providing the remote command to the remote application.

28. The system of claim 23, wherein the command delivery interface comprises a filtering function for filtering out specific types of commands previously specified as unallowable.

\* \* \* \* \*